(12) United States Patent
Shlaes et al.

(10) Patent No.: US 7,464,087 B2
(45) Date of Patent: Dec. 9, 2008

(54) METHOD AND SYSTEM OF UNIFYING DATA

(75) Inventors: Marc J. Shlaes, Shaker Heights, OH (US); Jochen van Berkel, Cologne (DE); Hermann Engel, Cologne (DE); Mario Jugel, Herschbach (DE)

(73) Assignee: Datatrak International, Inc., Cleveland, OH (US)

( * ) Notice: Subject to any disclaimer, the term of this patent is extended or adjusted under 35 U.S.C. 154(b) by 615 days.

(21) Appl. No.: 10/628,884

(22) Filed: Jul. 28, 2003

(65) Prior Publication Data

US 2004/0133543 A1 Jul. 8, 2004

Related U.S. Application Data

(60) Provisional application No. 60/398,841, filed on Jul. 26, 2002.

(51) Int. Cl.
*G06F 7/00* (2006.01)
(52) U.S. Cl. .................. 707/5; 707/3; 707/6; 707/104.1
(58) Field of Classification Search ............... 707/1–10, 707/100–104.1, 200–205
See application file for complete search history.

(56) References Cited

U.S. PATENT DOCUMENTS

| | | | |
|---|---|---|---|
| 5,442,791 A | 8/1995 | Wrabetz et al. | |
| 5,555,403 A | 9/1996 | Cambot et al. | |
| 5,596,744 A | 1/1997 | Dao et al. | |
| 5,873,093 A | 2/1999 | Williamson et al. | |
| 6,009,422 A | 12/1999 | Ciccarelli | |
| 6,092,099 A | 7/2000 | Irie et al. | |
| 6,199,059 B1 | 3/2001 | Dahan et al. | |
| 6,272,488 B1 | 8/2001 | Chang et al. | |
| 6,381,595 B1 | 4/2002 | Kleewein et al. | |
| 6,643,639 B2* | 11/2003 | Biebesheimer et al. | 707/3 |
| 6,853,994 B1* | 2/2005 | Gupta | 707/6 |
| 7,028,023 B2 | 4/2006 | Wang | |
| 2001/0052545 A1 | 12/2001 | Serebrennikov | |

FOREIGN PATENT DOCUMENTS

RU 2166792 C1 5/2001

(Continued)

OTHER PUBLICATIONS

International Search Report dated Jan. 14, 2004.

(Continued)

*Primary Examiner*—Mohammad Ali
*Assistant Examiner*—Fred I Ehichioya
(74) *Attorney, Agent, or Firm*—Calfee, Halter & Griswold LLP

(57) ABSTRACT

A system, method and database design is provided for unifying data from a plurality of heterogeneous databases, each having business-context related data and a data access mechanism. A database is created (e.g., the UniDimNet) which contains a node for each dimension of an industry. For each data source which is accessible via the system, a set of data source specific dimensions is created and mapped to the corresponding industry business context dimension(s). A set of templates (e.g., UniViews) is created to query the data sources. Each UniView contains a specific question for a specific dimension designed for a specific data source. UniViews query the database they are associated with by using the data access mechanism of the associated database. A central server coordinates the system and facilitates use of the system through an interface (e.g., the UniViewer). The UniViewer allows a user to query the data sources by identifying an industry business context dimension, a dimension instance and at least one UniView. Multiple UniViews can be combined, cached and saved to facilitate complex queries.

52 Claims, 25 Drawing Sheets

FOREIGN PATENT DOCUMENTS

RU 2172012 C1 8/2001
WO 02/21259 A1 3/2002

OTHER PUBLICATIONS

IBM Discovery Link product information, www-1.ibm.com/industries/lifesciences/doc/content/solution/939513321.html.

IBM Life Sciences Solutions: Turning Data into Discovery with DiscoveryLink product information, Mar. 2002.

IBM Discovery Link product information, www-1.ibm.com/industries/lifesciences/doc/content/solution/939513321.html, Apr. 12, 2004.

Supplementary European Search Report, European App. No. EP 03 77 2021, Completed Sep. 18, 2007, Transmitted Sep. 27, 2007 (3 pages).

* cited by examiner

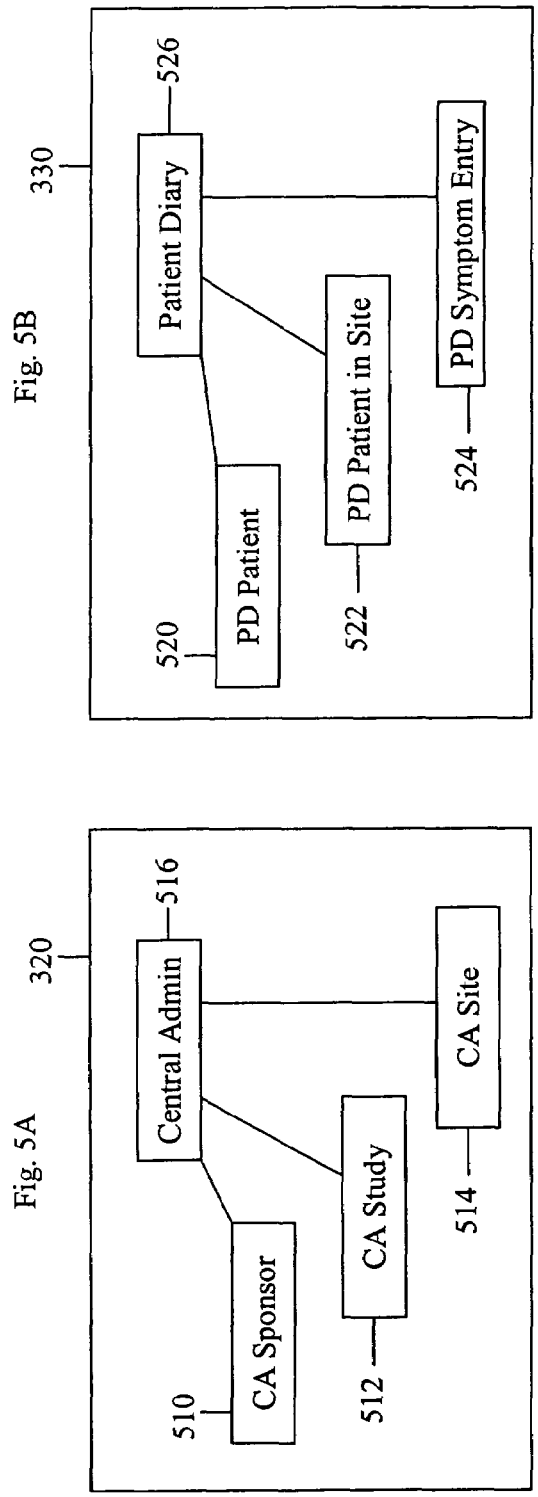
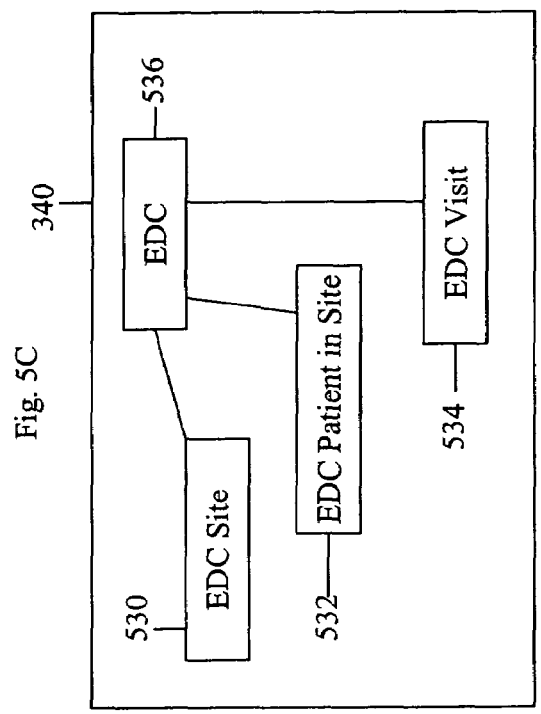
Fig. 5A
Fig. 5B
Fig. 5C

Fig. 19

| | SiteName | SiteDescription | EDC_AdminID | EDC_NaSpl |
|---|---|---|---|---|
| ⊞ | Cleveland... | (null) | 11 | 5 |
| ⊞ | Stadt Klinik Bonn | Krhs. | 11 | 5 |
| ⊞ | Sebastianus... | Krhs. des hlg.... | 11 | 5 |
| ⊞ | (null) | (null) | (null) | (null) |
| ⊞ | (null) | (null) | (null) | (null) |

Site — 1910

Result

| Description | AdminID | NaSpID | VISIT_DATE_VISIT_2 |
|---|---|---|---|
| Krhs. | 11 | 5 | 06/06/2002 |
| Krhs. | 11 | 5 | 06/06/2002 |
| Krhs. | 11 | 5 | 06/01/2002 |
| Krhs. | 11 | 5 | 06/05/2002 |
| Krhs. | 11 | 5 | 06/02/2002 | tion Study[32]

liance
_VISIT_DATE
_Visit_date  ← 1920
_VISIT_ERROR
_COMPLIANCE
_AE_TRIGGER
cal Examination
omitant Medicatio

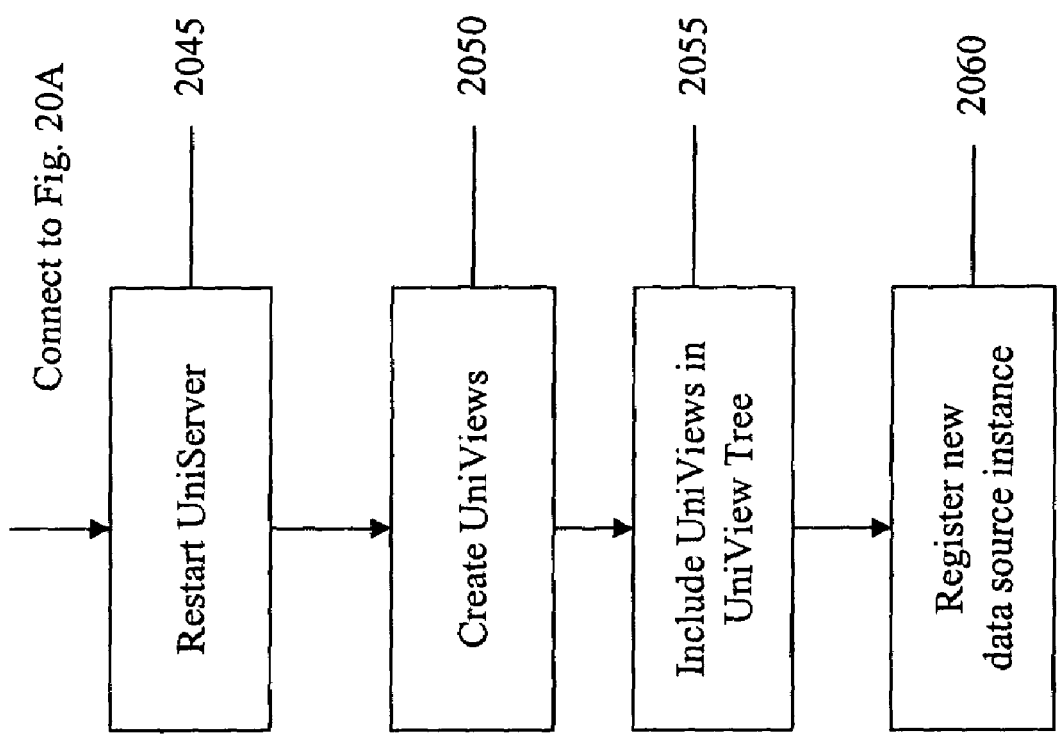

METHOD AND SYSTEM OF UNIFYING DATA

CROSS-REFERENCE TO RELATED APPLICATIONS

This application claims the benefit of U.S. Provisional Application No. 60/398,841 filed Jul. 26, 2002.

TECHNICAL FIELD OF THE INVENTION

The present invention relates to the database management arts. It finds particular application as a method and system for accessing heterogeneous data in a plurality of databases.

BACKGROUND OF THE INVENTION

Most modern businesses employ a multitude of different software applications which collect and store huge amounts of data. These applications store data in a multitude of different ways (e.g., a flat file, a relational database or an object database) and in a format specific to the application in question (e.g., a binary file format). Access to this data is achieved through a variety of differing mechanisms (e.g., a direct database query, various reporting tools, or via an application program interface (an "API")), each offering differing levels of flexibility, ease of use and coherence to the business concepts underlying the data. This data is generally heterogeneous but also generally related in terms of the underlying business concepts which drive and populate the databases.

It is generally desirable for such a business to pull together all of this data and access it centrally, with data from different applications merging together to afford views which span the multiple and disparate applications and which further offer overall pictures relating to the underlying business concepts. Such an aggregation is difficult, however, as each data source may have its data stored in a unique, individual way on some form of persistent hardware which is not necessarily compatible with the ways and hardware of other data sources. Furthermore, the actual format of the data is usually very complex and not directly business-relevant, which exacerbates the difficulty in aggregating, or unifying, the data in the multiple data sources.

To attempt to alleviate these difficulties, it is desirable for each data source to offer some form of data access mechanism (e.g., a set of pre-built queries or a set of API's) to facilitate access to itself. These mechanisms offer access to sets or subsets of information which are more abstract and meaningful in a business sense than the raw data stored in each data source. For example, a pre-built query may query a data base to retrieve all information relating to a particular individual and return only information relevant to such an individual. While such data access mechanisms are beneficial for obtaining business-relevant information from a single database (or at least a single type of database), such data access mechanisms are specific to the application which relates to the database. The design and technical specifications for any particular data access mechanism generally differs significantly from that of another particular data access mechanism. As such, a data access mechanism for a particular database is not likely useable for a different database, let alone for each of the many disparate databases which make up the information store of a modern business. Such access mechanisms are not readily adaptable to facilitate views which span multiple databases and which further facilitate overall pictures relating to underlying business concepts.

The need exists, therefore, to provide a method and system for unifying data from a plurality of heterogeneous databases, each having business-context related data and a data access mechanism.

SUMMARY OF THE INVENTION

In accordance with one embodiment of the present invention, a system for unifying data relating to an industry having a plurality of industry business context dimensions is provided. The system includes a plurality of data sources, each having data which is capable of grouping into at least one data source specific dimension, and at least one having a physical or logical structure differing from at least one other. The system further includes a database having a first and a second plurality of nodes, each of the first plurality representing an industry business context dimension, and each of the second plurality representing a data source specific dimension. The system still further includes a plurality of data source query function calls, each call querying a single data source regarding a single data source specific dimension.

In accordance with another embodiment of the present invention, a system for managing data in a plurality of data sources is provided. The system includes a UniDimNet and a plurality of UniViews. The UniDimNet includes a plurality of UniDims representing industry business context dimensions and a plurality of DataSourceDims representing data source specific dimensions of each data source. Each UniDim is related to at least one other UniDim, and each DataSourceDim is related to at least one UniDim. UniViews may be combined into complex queries. A complex query may have a set of input parameters, which do not include identification of a particular data source.

In accordance with yet another embodiment of the present invention, a method for managing data in a plurality of data sources is provided. The method includes the steps of identifying a plurality of industry business context dimensions, identifying at least one data source specific dimension for each data source, providing a UniDimNet, providing a plurality of UniViews, formulating a complex query and providing the results of the query.

In accordance with still another embodiment of the present invention, a method for querying data in a plurality of data sources is provided. The method includes the steps of receiving a dimension to be queried, providing a plurality of data source query function calls to select from, creating a result set including columns defined by the selected function calls, receiving the identity of at least one dimension instance to query, and populating the columns with the results of the query.

An advantage of the present invention is that a plurality of data sources containing heterogeneous data may be unified and queried. A further advantage of the present invention is that a plurality of data sources having differing logical or physical structures can be queried by a single system using the data access mechanisms which are provided for each data source. Still a further advantage of the present invention is that complex queries for the data sources can be created, modified and carried out across the complete set of data sources. An additional advantage is that related data within multiple data sources can be queried without having to identify each particular data source in the query.

These and other aspects and advantages of the present invention will be apparent to those skilled in the art from the following description of the preferred embodiments in view of the accompanying drawings.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIGS. 5A-5C are exemplary diagrams of data source data structures in accordance with one embodiment of the present invention;

FIGS. 16-19 are exemplary screen shots of a UniViewer interface in accordance with one embodiment of the present invention;

FIGS. 20A-20B is an exemplary flowchart of a method to add a data source in accordance with one embodiment of the present invention;

DETAILED DESCRIPTION OF THE INVENTION

Figure 1:
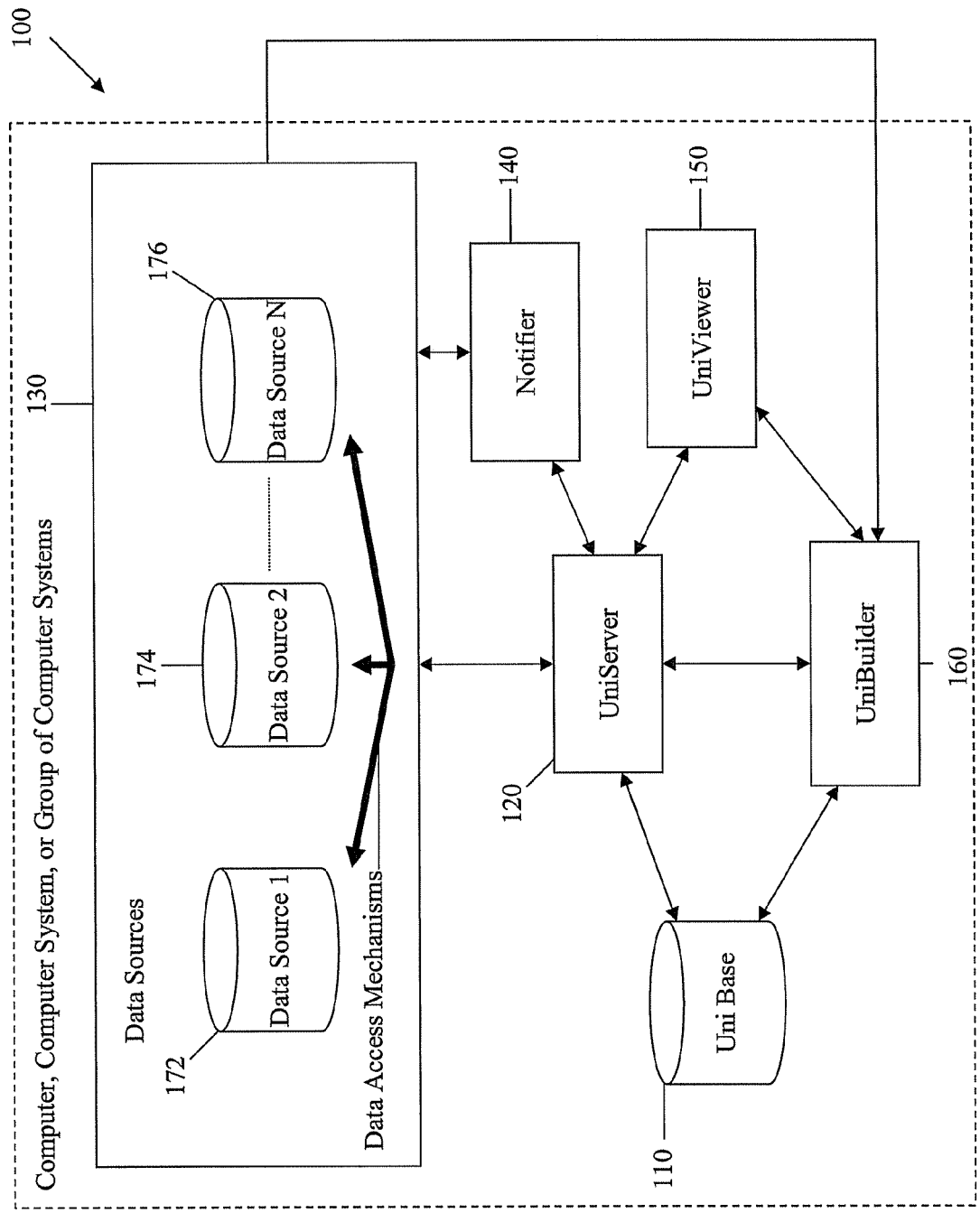
FIG. 1 is an exemplary overall system diagram of a system for unifying data in accordance with one embodiment of the present invention.

The following includes definitions of exemplary terms used throughout the disclosure. For illustrative purposes only, and not to limit the disclosure of the invention set forth herein, an exemplary industry and an exemplary group of databases will be used herein to illustrate examples of certain embodiments of the present invention. The exemplary industry is the pharmaceuticals industry, and particularly the pharmaceuticals industry as such relates to clinical trials and clinical trial evaluations of certain drugs on certain patients.

In the pharmaceuticals industry, a sponsor is an entity (e.g., a drug or medical device company) which is desirous of having a drug (or other medical device) tested for, inter alia, FDA approval. Such tests are conducted as one or more clinical trials, or studies. Each study typically incorporates one or more sites (e.g., a particular hospital or doctors' practice group) at which one or more patients uses the drug on a trial basis. Records are kept of the patient and the patient's use of the drug, including any symptoms. Such records are oftentimes captured electronically via an electronic data capture ("EDC") suite of software applications and stored in associated database(es). Although the present example is described in terms of clinical trials and the pharmaceuticals industry, those skilled in the art will readily appreciate that the invention will find application in any industry which uses multiple heterogeneous databases as set forth herein.

In the following definitions of exemplary terms, both singular and plural forms of all terms fall within each meaning. Except where noted otherwise, capitalized and non-capitalized forms of all terms fall within each meaning:

As used herein, "data" is used generically and includes but is not limited to information in a form suitable for processing by a computer. Except where noted otherwise, "data" is information (including operational and legacy) which is contained or capable of being contained in a data source (as defined below). In the pharmaceuticals example, "data," includes but is not limited to individual patient information such as height, weight, sex and age; study information such as particular EDC response(se); and study information such as the identity of the drug.

As used herein, "data source" is used generically and includes but is not limited to a database and/or software application which provides and/or stores data. In the pharmaceuticals example, a "data source" is a database which contains information relating to a sponsor, site, study, patient or any other entity related to the pharmaceuticals industry.

As used herein, "data source instance" is a particular installation of a data source. In the pharmaceuticals example, a "data source instance" is a real installation of a data source accessed by a system of the present invention. For example, a database containing information for a study which was not previously accessed by a system of the present invention would be considered a new "data source instance" to the system.

As used herein, "data access mechanism" is used interchangeably with "data retrieval mechanism" and is used generically, including but not limited to a software application or module of a software application which facilitates access to and retrieval of data from a data source. Typically a data access mechanism is specific to the database and/or software application (or database type or software application type) to which it is related, being customized to access same in response to a query. Exemplary data access mechanisms include, but are not limited to, pre-built database queries, pre-built database views and sets of application program interfaces (API's).

As used herein, a "dimension" is a specific logical concept within an industry. In the pharmaceuticals example, "dimensions" include but are not limited to "sponsor," "study," "site" and "patient," each of which defines a specific logical concept within the pharmaceuticals industry. In this example, "dimensions" can be conceptualized as a set of interrelated entities (e.g., sponsor, study, site and patient) which correspond to specific interrelated industry concepts (e.g., the sponsors of clinical trials, studies for particular drug(s), site(s) at which the drug is tested, and patient(s) which participate in the study).

As used herein, "industry business context" is a set of dimensions which define the data pertinent to an industry. In the pharmaceuticals example, the "industry business context" is the set of dimensions which define all the data which is pertinent to the pharmaceuticals industry and which is to be accessible by a system or method of the present invention. Generally speaking, the complete set of data which is defined by the pharmaceuticals industry and which is accessible by a method or system of the present invention is grouped or categorized into logical concepts (dimensions), the complete set of which defines the industry business context of the pharmaceuticals industry.

As used herein, "industry business context dimension" is used interchangeably with "dimension."

As used herein, "dimension instance" is a particular embodiment (or record) of a dimension. In the pharmaceuticals industry example, wherein "patient" is a dimension, a particular person who is a patient (e.g., Joe Smith) is a "dimension instance" of that dimension.

As used herein, "data source specific dimension" is a specific logical concept within a data source. In an embodiment, a "data source specific dimension" is a set or subset of data contained within a data source which is more abstract and meaningful in a business sense than the raw data stored in the data source. In the pharmaceuticals industry example, a particular database contains data from a particular study, including data relating to the sites of the study, the patients in the study and EDC responses from the study. In this example, "data source specific dimensions" can be conceptualized as a set of interrelated entities (e.g., "study," "site," "patient" and "EDC responses") which correspond to the data in the data source and are defined for that particular data source. In an embodiment, a "data source specific dimension" is a set of conceptually-related data which can be retrieved from a data source or a plurality of data sources.

As used herein, "data source business context" is a set of data source specific dimensions which define the data in a particular data source. Generally speaking, the complete set of data which is contained in a data source is grouped or categorized into logical concepts (data source specific dimensions), the complete set of which defines the "data source business context" of the data source.

As used herein, "logic" is used generically and includes but is not limited to hardware, software and/or combinations of both to perform a function.

As used herein, "software" is used generically and includes but is not limited to one or more computer executable instructions, routines, algorithms, modules or programs including separate applications or from dynamically linked libraries for performing functions as described herein. Software may also be implemented in various forms such as a servlet, applet, stand-alone, plug-in or other type of application. Software can be maintained on various computer readable mediums as known in the art.

As used herein, "network" is used generically and includes but is not limited to the Internet, intranets, Wide Area Networks, Local Area Networks and transducer links such as those using Modulator-Demodulators (modems).

In an embodiment, the present invention is directed to a system, method and database design for unifying data from a plurality of heterogeneous databases, each having business-context related data and a data access mechanism. A database is created (the UniDimNet) which contains a node for each dimension of an industry. For each data source which is accessible via the system, a set of data source specific dimensions is created and mapped to the corresponding industry business context dimension(s). A set of templates (UniViews) is created to query the data sources. Each UniView contains a specific question for a specific dimension designed for a specific data source. UniViews query the database they are associated with by using the data access mechanism of the associated database. A central server (the UniServer) coordinates the system and facilitates use of the system through an interface (the UniViewer). The UniViewer allows a user to query the data sources by identifying an industry business context dimension, a dimension instance and at least one UniView. Multiple UniViews can be combined, cached and saved to facilitate complex queries. Although the present invention is described with reference to an exemplary set of databases relating to clinical trials for the pharmaceutical industry, those skilled in the art will readily appreciate that the invention will find application in any type of database management setting involving the management of a plurality of heterogeneous databases, for example, in the management of heterogeneous databases involved with payroll or corporate human resources applications.

With reference to FIG. 1, an overview of a system for unifying data 100 of the present invention is shown. In this embodiment, system 100 includes UniBase 110, UniServer 120 and at least one data source 130, and may further include any or all of Notifier 140, UniBuilder 150 and UniViewer 160. System 100 exists on any suitable computer, computer system or related group of computer systems known in the art. In an embodiment, UniBase 110 and UniServer 120 exist on a central server. Notifier 140, UniBuilder 150 and UniViewer 160 optionally also exist on the central server. Data sources 130 are optionally located on the central server or on a remote computer or a remote computer system (not shown). In an embodiment in which any element disclosed herein is located on a computer or computer system remote from other elements of the system, an appropriate electronic connection, including but not limited to a network connetion, is established between the remote elements to facilitate communication therebetween. Any appropriate network or other communication method may be used. System 100 is embodied in any suitable programming language or combination of programming languages, including database managers and SQL.

Figure 2:
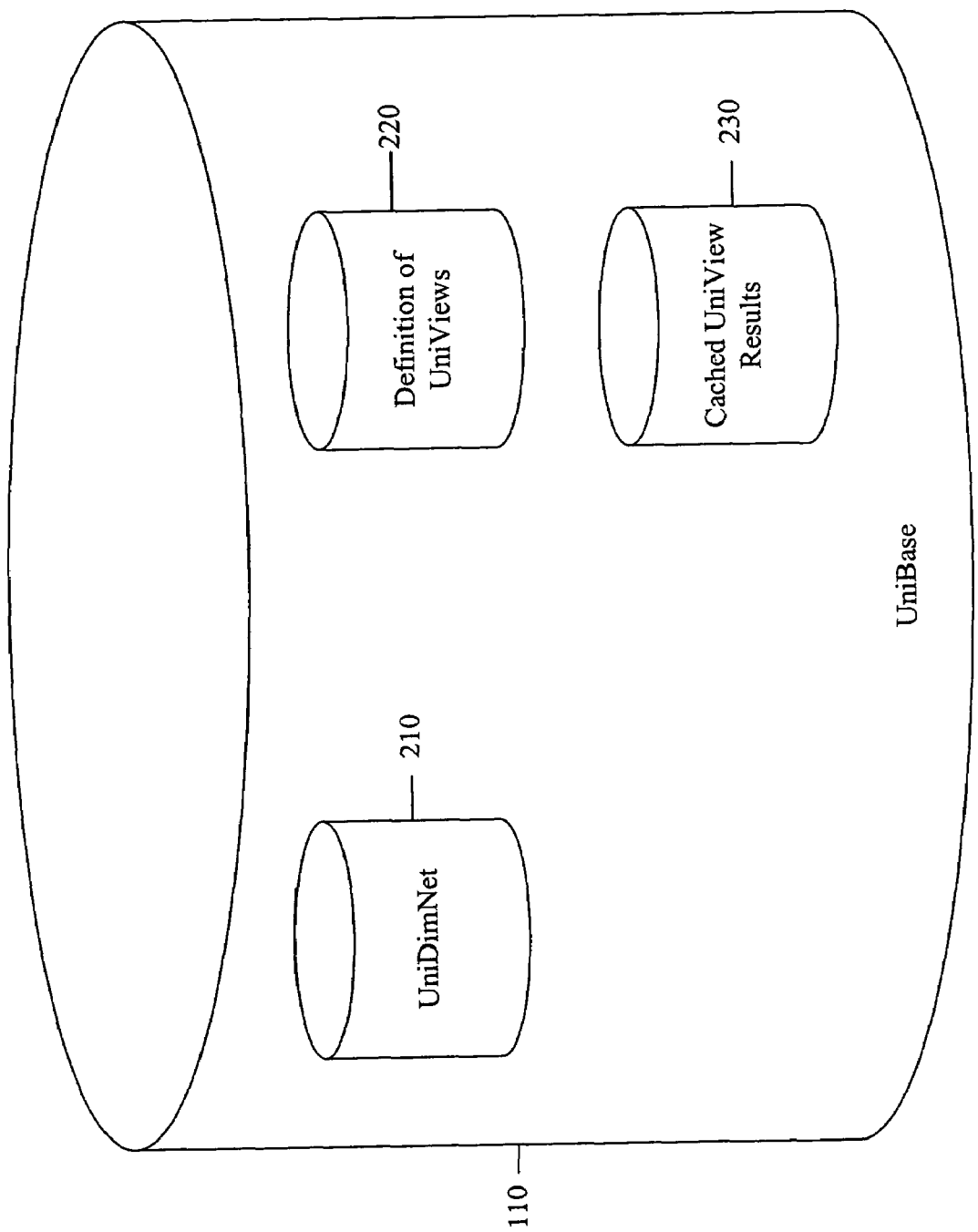
FIG. 2 is an exemplary diagram of a database in accordance with one embodiment of the present invention.

With reference to FIG. 2, system 100 of the present invention includes UniBase 110. UniBase 110 is a database which stores and facilitates access to UniDimNet 210 and, optionally, UniView table 220 and cached UniView results 230. UniBase 110 is any suitable database for storing data and is embodied in any suitable database program, including but not limited to database software offered by Oracle.

Figure 3:
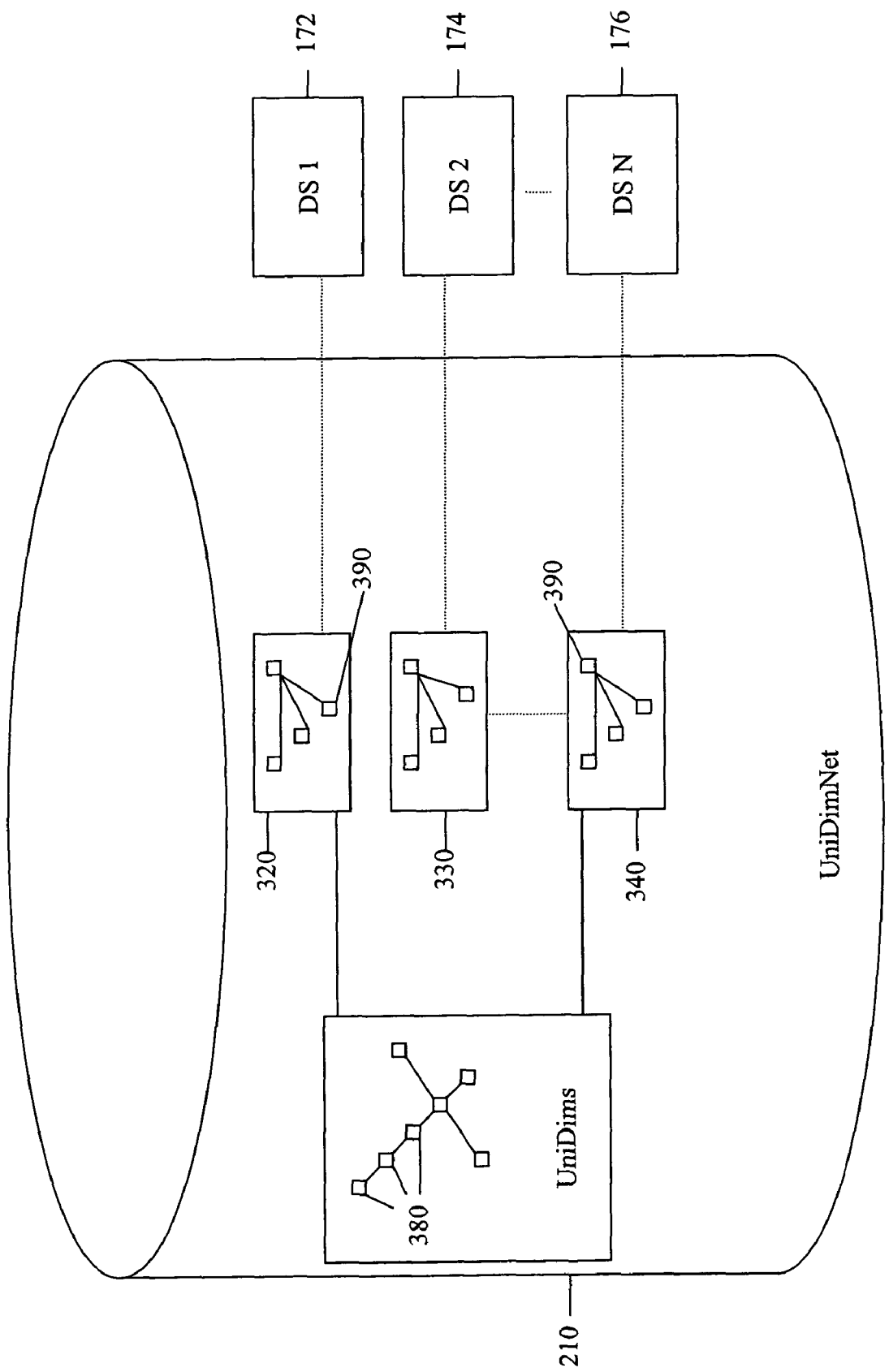
FIG. 3 is an exemplary diagram of a data structure in accordance with one embodiment of the present invention.

With reference to FIG. 3, UniDimNet 210 is a database which contains a representation of all industry business context dimensions which are relevant to system 100 and their interconnections. UniDimNet 210 further contains a representation of all data source dimensions for all data sources accessible by system 100 and their interconnections. UniDimNet 210 still further contains connections (or relations) between represented industry business context dimensions and represented data source dimensions.

Each industry business context dimension which is used in system 100 is represented by a UniDim, the complete set of which for system 100 is represented at 310. A UniDim is an entry and description in the UniDimNet 210 database which represents and defines a unique industry business context dimension within system 100.

The complete set of UniDims 310 can be represented in UniDimNet 210 by any suitable mechanism. In an embodiment, each UniDim 380 is a node in a network which defines UniDimNet 210 and which acts as a single point of reference for all information relating to the specific industry business context dimension represented by the UniDim. The complete set of dimensions for an industry of system 100 is defined by any suitable mechanism. In an embodiment, the complete set of dimensions is defined by analyzing the industry and the industry's use of data sources to determine which business concepts can be naturally grouped together or most advantageously grouped together by relevance. In another embodiment, the complete set of dimensions is defined by analyzing the data of a given industry to determine which concepts in the data are most frequently referenced, cited and/or queried. In still another embodiment, the complete set of dimensions is defined by reviewing all data sources accessible to a system 100 and determining logical groupings of the data based upon the business context of the industry, irrespective of the physical and/or logic groupings from the native data sources.

Figure 4:
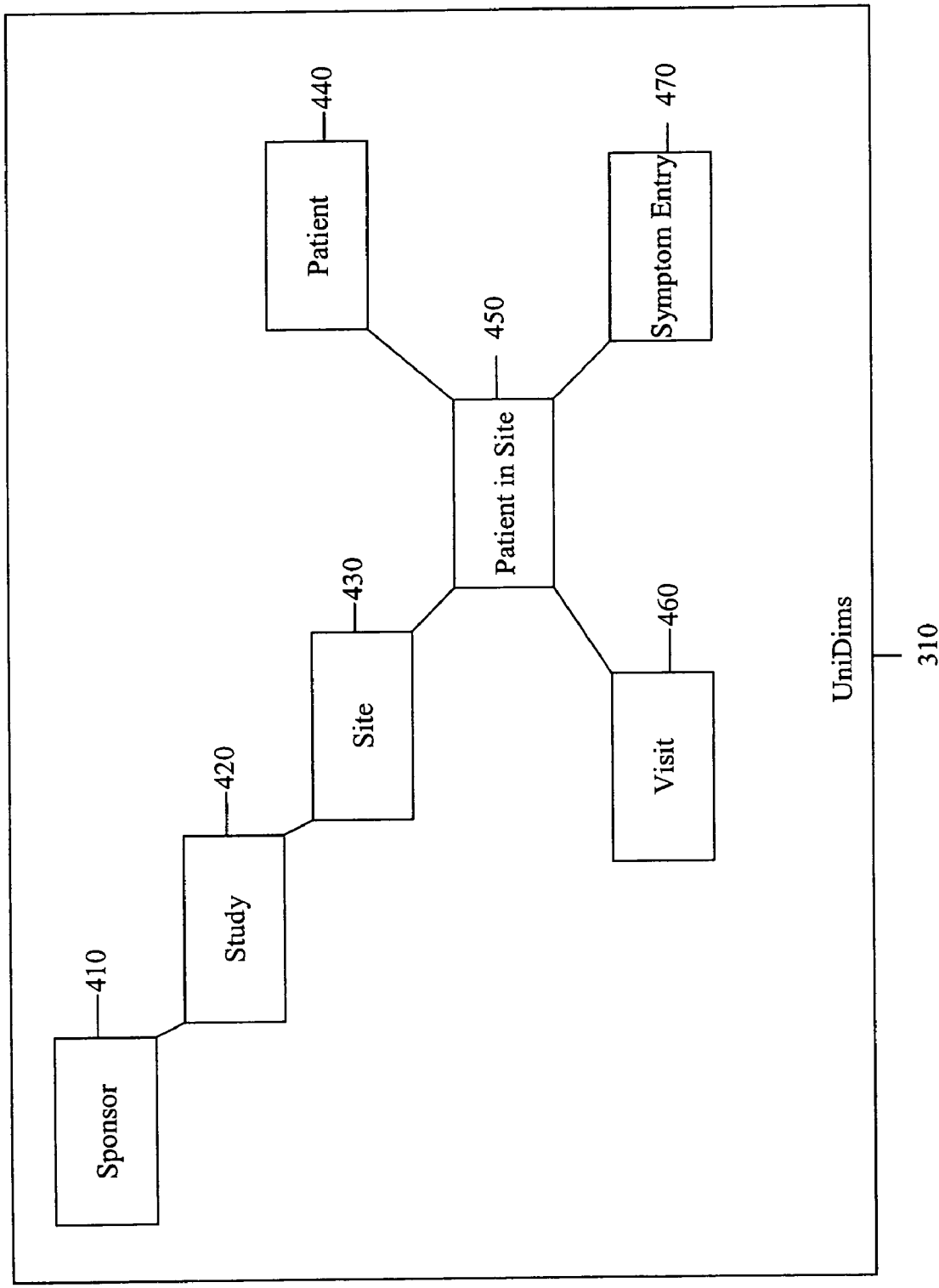
FIG. 4 is an exemplary diagram of a dimensional data structure in accordance with one embodiment of the present invention.

With reference to FIG. 4, an exemplary complete set of dimensions for the exemplary pharmaceuticals industry is illustrated. In this example, complete set of UniDims 310 contains a plurality of UniDims 410 through 470 which define the pharmaceuticals industry business context. While only seven UniDims are represented in this example, it will be appreciated that any number of suitable UniDims may be defined, and it will be further appreciated that many systems of the present invention may include a significantly greater number of UniDims as required to define an industry's business context. In this example, UniDim 410 represents the dimension "sponsor;" UniDim 420 represents the dimension "study;" UniDim 430 represents the dimension "site;" UniDim 440 represents the dimension "patient;" UniDim 450 represents the dimension "patient in site;" UniDim 460 represents the dimension "visit;" and UniDim 470 represents the dimension "symptom entry."

Each UniDim is related to at least one other UniDim. As illustrated in FIG. 4, the UniDims of this pharmaceutical example are all roughly hierarchically related. UniDim 410 (sponsor) may relate to one to many studies (represented by UniDim 420—multiple UniDims 420 not shown), each study may relate to one to many sites (represented by UniDim 430-multiple UniDims 430 not shown) and each site may relate to one to many patients (represented by UniDim 450—multiple UniDims 450 not shown). Each UniDim 450 (i.e., each patient in the site) may relate to one to many "patient" UniDims 440 (representing information regarding the patient, such as height, weight, etc.), one to many "symptom entry" UniDims 470 (representing patient symptom entries) and one to many "visit" UniDims 460 (representing patient visits). As graphically illustrated in FIG. 4, certain UniDims are deemed to be "higher" in the hierarchy than other UniDims. For example, UniDim 410 is "higher" in the network of UniDims than UniDim 430. In an embodiment, each UniDim in the network is viewed as one dimensional, while information regarding the hierarchical relationships between the nodes extends the network into a second dimension.

With reference again to the UniDimNet 210 in FIG. 3, each UniDim 380 in the complete set of UniDims 310 is mapped, or related, to at least one data source specific dimension 390 contained in a complete set of data source specific dimensions (e.g., 320, 330 and 340) corresponding to a specific data source (e.g., with additional reference to FIG. 1, data sources 172, 174 and 176) accessible to system 100. As illustrated in FIG. 1, system 100 accesses a plurality of data sources 130, as exemplified by data sources 172, 174 and 176. While three data sources are illustrated, it will be appreciated that any number of data sources may be accessed by a system 100 of the present invention.

With reference to FIGS. 1 and 3, data sources 172, 174 and 176 may be any suitable data source containing information relevant to the industry and accessed and/or accessible to system 100. With reference to FIG. 3, for each data source accessible by system 100 a complete set of data source specific dimensions (e.g., complete set 320 for data source 172) is created. The complete set of data source specific dimensions for any data source may be determined by any suitable mechanism. In an embodiment, the internal data structure(s) of the data source and the business information represented by the data is analyzed to determine the logical "groups" or associations of data which define each individual data source specific dimension. In another embodiment, the business context of each set of information within a data source is analyzed to further define the data source specific dimensions for the data source. In still another embodiment, the industry business context dimensions contained in system 100 are consulted to determine whether the data in the data source can be conceptually grouped consistently with the industry business context. In still another embodiment (such as with a relational database, as illustrated below), the internal structure of the data source defines each business source specific dimension for a data source.

Exemplary data sources and corresponding data source specific dimensions are illustrated in FIGS. 5A, 5B and 5C. In this exemplary embodiment, data source 172 (FIG. 5A) comprises a data source such as DATATRAK Central Administration ("DATATRAK CA"), an exemplary database provided by DATATRAK International, Inc. In the DATATRAK CA, original data is either stored in a dedicated table, a set of tables or in a generic table. The complete set of data source specific dimensions depends upon the nature of the information stored in these tables and the type of information accessed from system 100. In an embodiment wherein information to be accessed by system 100 is contained in dedicated tables within DATATRAK CA, pre-defined classes relating to the dedicated tables define the data source specific dimensions. The classes, as with the corresponding data source specific dimensions, can span across a set of tables to select data from each to facilitate business-context grouping, thereby allowing decoupling of the original data (and original data tables) from the business context. In an embodiment wherein information to be accessed by system 100 is contained in generic tables within DATATRAK CA, data source specific dimensions are derived from the content of specific fields within the original data. Specific fields are grouped based upon the business-context of the fields. Once the complete set of data source specific dimensions is defined for data source 172 and the specific data source specific dimensions thereof created, the complete set 320 is stored in UniDimNet 210.

With reference to FIG. 5A, exemplary data source specific dimensions for exemplary data source 172 (DATATRAK CA) include "CA Sponsor," "CA Study" and "CA Site." These data source specific dimensions relate to conceptual groupings of data within DATATRAK CA which relate to, respectively, sponsors in the data source, studies in the data source and sites in the data source. Each data source specific dimension which is used in system 100 is represented in the UniDimNet 210 as a DataSourceDim, the complete set of which for data source 172 is represented at 320. A DataSourceDim is an entry in the UniDimNet 210 database which represents a unique data source specific dimension within system 100. Data source specific dimension "CA Sponsor" is represented by DataSourceDim 510, data source specific dimension "CA study" is represented by DataSourceDim 512 and data source specific dimension "CA Site" is represented by DataSourceDim 514. An additional DataSourceDim, "Central Admin" 516, is defined for DATATRAK CA as a special DataSourceDim which refers to the data source itself (DATATRAK CA). Each DataSourceDim in the complete set for a particular data source is linked to the special DataSourceDim for that data source.

Further in this exemplary embodiment, data source 174 comprises a data source which is organized to facilitate generic SQL data queries. In such a SQL database (generally speaking, a relational database), the original data of the database is stored in tables which directly represent a particular business-context grouping. In this regard, the data source specific dimensions for such a data base may be derived directly from the tables in which the data is stored. For example, the database may contain a table for "patient" which contains patient information. Such a table may be consistent with a data source specific dimension for "patient." Alternatively, data source specific dimensions may be defined which span multiple tables, as long as the data selected from each table is related in a business context. Once the complete set of data source specific dimensions is defined for data source 174 and the specific data source specific dimensions thereof created, the complete set 330 is stored in UniDimNet 210 as representative DataSourceDims. With reference to FIG. 5B, exemplary DataSourceDims 520, 522 and 524 represent data source specific dimensions "PD Patient," "PD Patient in Site" and "PD Symptom Entry" respectively. As with complete set 310 for data source 172, special DataSourceDim 526 referring to data source 174 is created in complete set 330 for data source 174.

Still further to this exemplary embodiment, data source 176 comprises a data source which is fully generic and not designed to include any specific tables for any specific concepts, such as exemplary DATATRAK EDC Database (DATATRAK EDC) provided by DATATRAK International, Inc. Such a database is accessed by an API (such as DATATRAK QUESTIONVIEW®) and does not contain any internal structure which would aid in creating data source specific dimensions. In such a case, data source specific dimensions are created by any suitable mechanism. In an embodiment, data source specific dimensions for such a database are created by accessing metadata regarding the data stored in the database and by analyzing the data contained in the database in light of the industry business context. Once the complete set of data source specific dimensions is defined for data source 176 and the specific data source specific dimensions thereof created, the complete set 340 is stored in UniDimNet 210 as representative DataSourceDims. With reference to FIG. 5C, exemplary DataSourceDims 530, 532 and 534 represent data source specific dimensions "EDC Site," "EDC Patient in Site" and "EDC Visit" respectively. As with complete set 310 for data source 172, special DataSourceDim 536 referring to data source 176 is created in complete set 340 for data source 176.

Figure 6A:
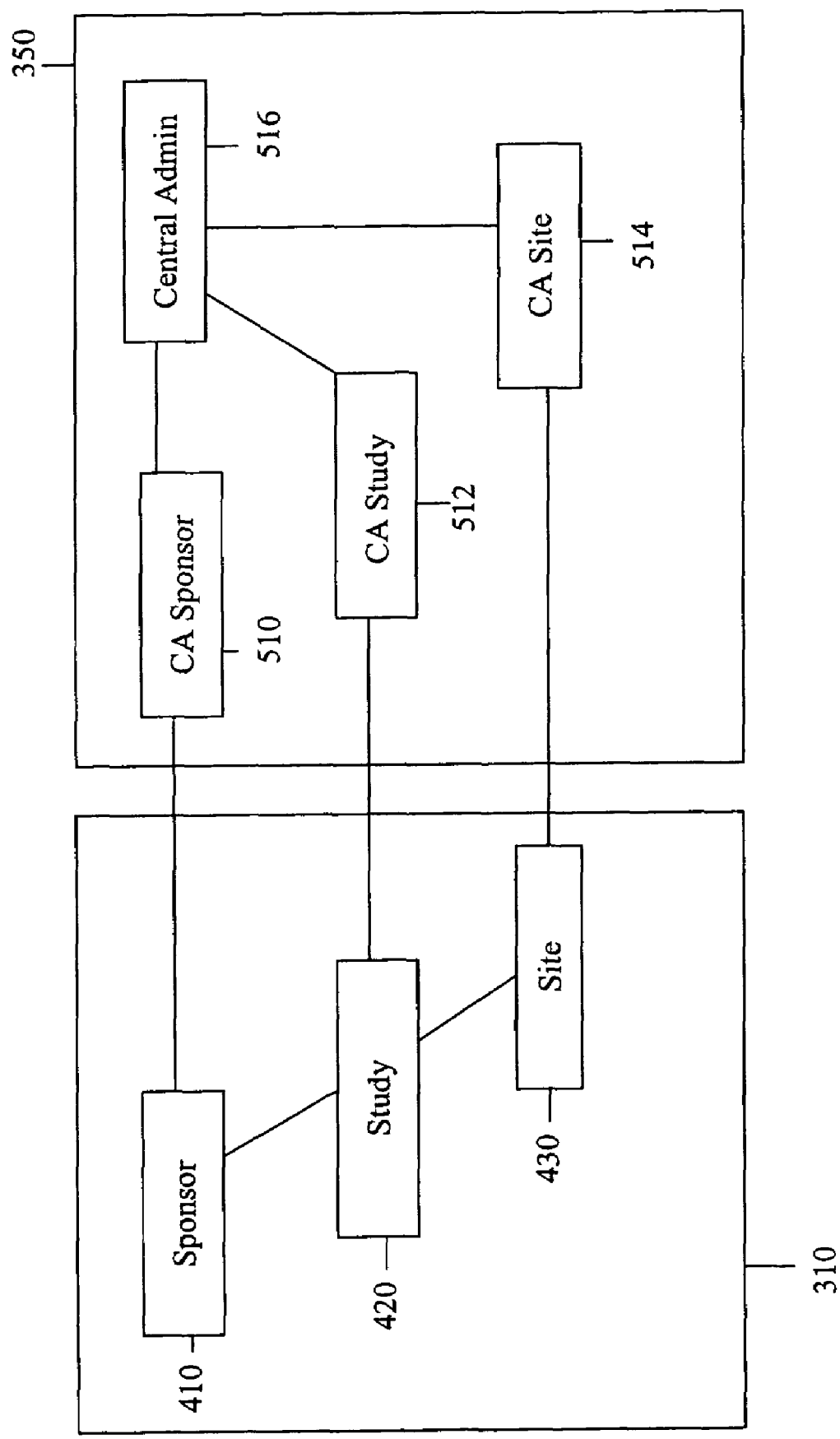
FIGS. 6A-6C are exemplary diagrams of data structure relationships in accordance with one embodiment of the present invention.

With reference again to FIG. 3, once the complete sets of DataSourceDims (as illustrated by exemplary complete sets 320, 330 and 340) have been created and stored in the UniDimNet 210, each DataSourceDim therein is mapped, or linked, to a corresponding UniDim in the complete set of UniDims 310. With reference to FIG. 6A, mapping of DataSourceDim complete set 350 to a portion of the complete set of UniDims 310 is illustrated. DataSourceDim 510, which relates to the data source specific dimension "CA Sponsor," which itself relates to CA Sponsor information contained with in the data source DATATRAK CA, is related to UniDim 410 "sponsor," which relates to the industry business context dimension "sponsor." In this regard each DataSourceDim except the special DataSourceDim referring to the data source is related to a corresponding UniDim. A UniDim is "corresponding" if it relates to the same or similar dimension as the data source specific dimension. Similarly, DataSourceDim 512 "CA study" is related to UniDim 420 "study" and DataSourceDim 514 "CA Site" is related to UniDim 430 "site."

Figure 6B:
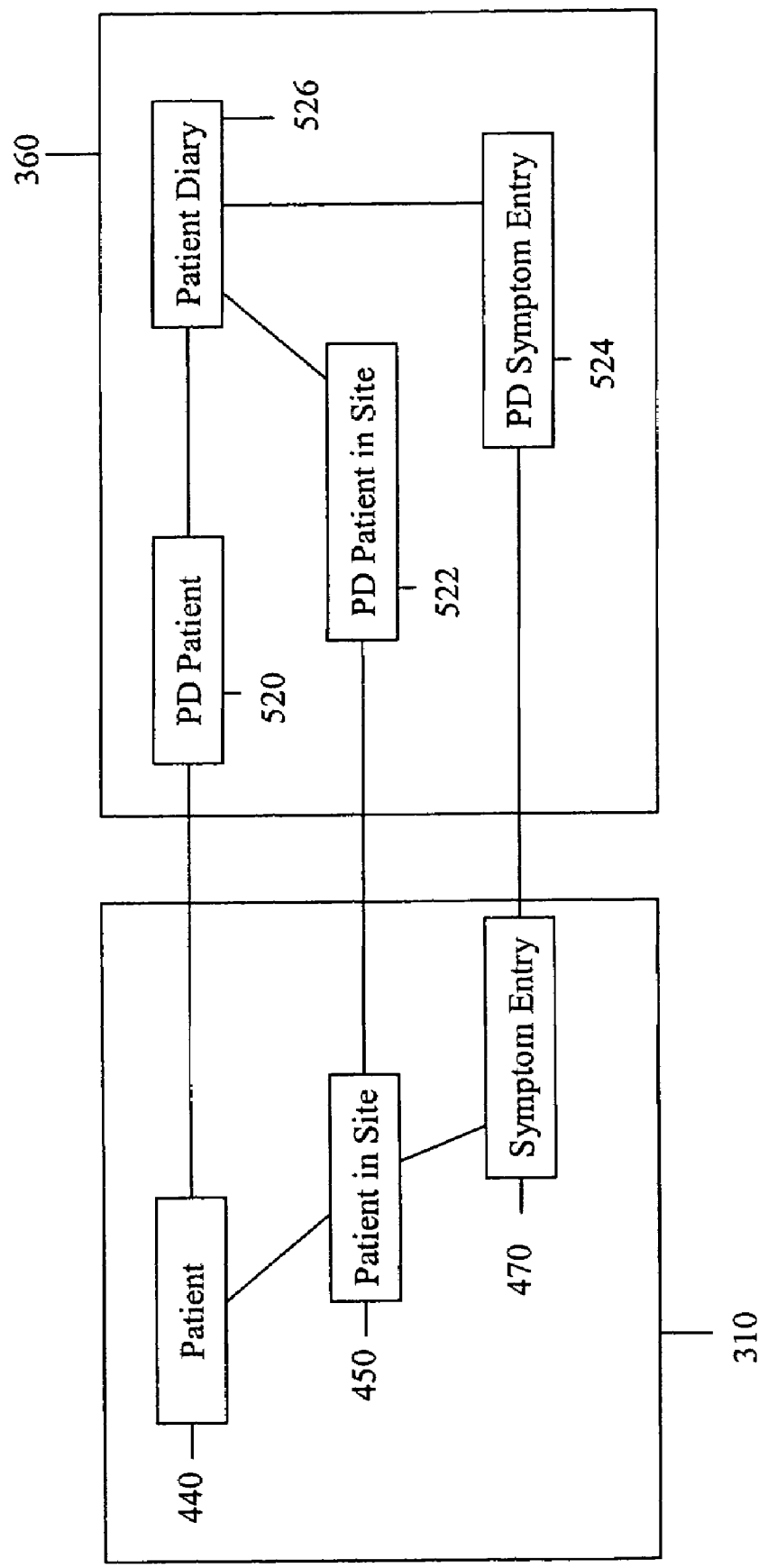
Figure 6C:
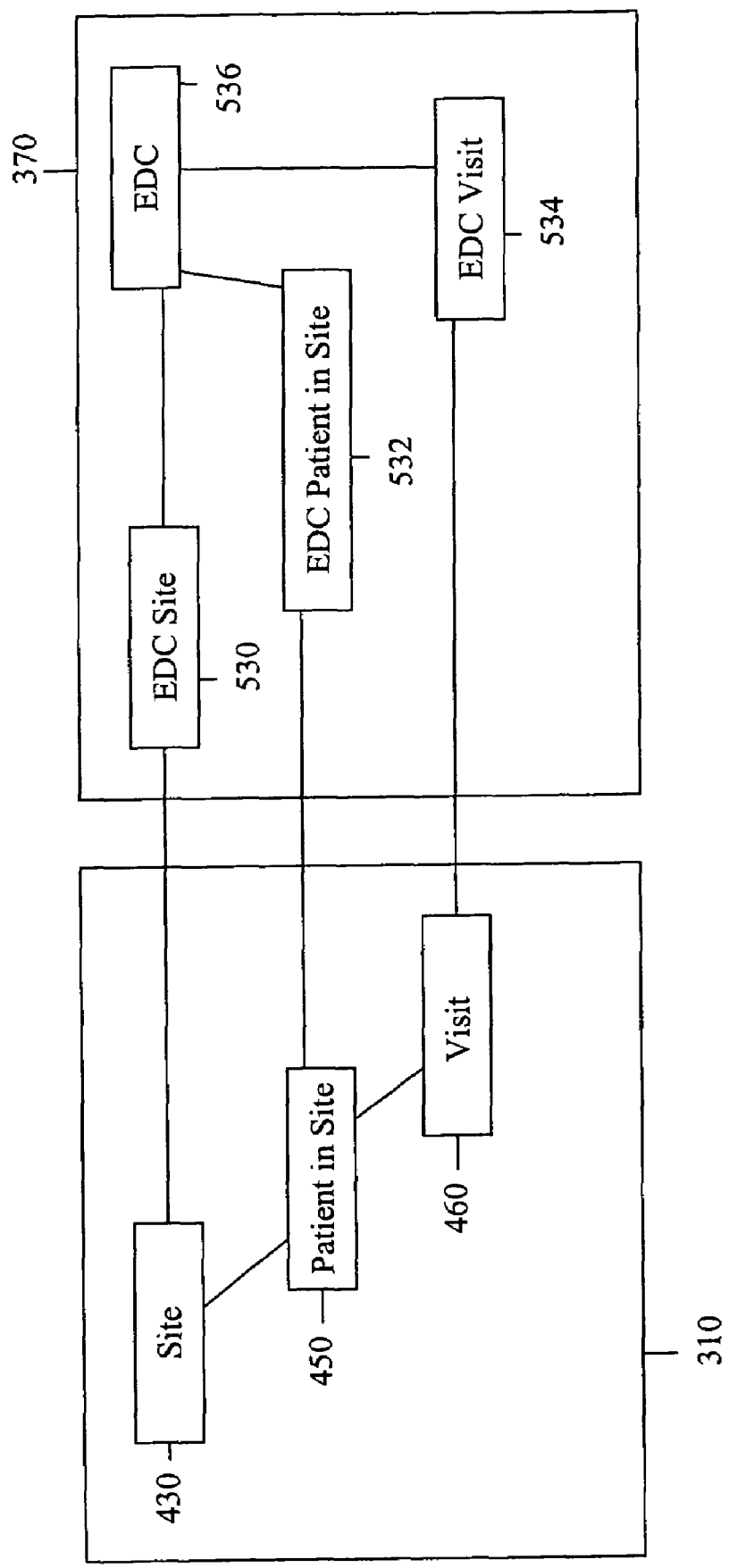
Figure 7:
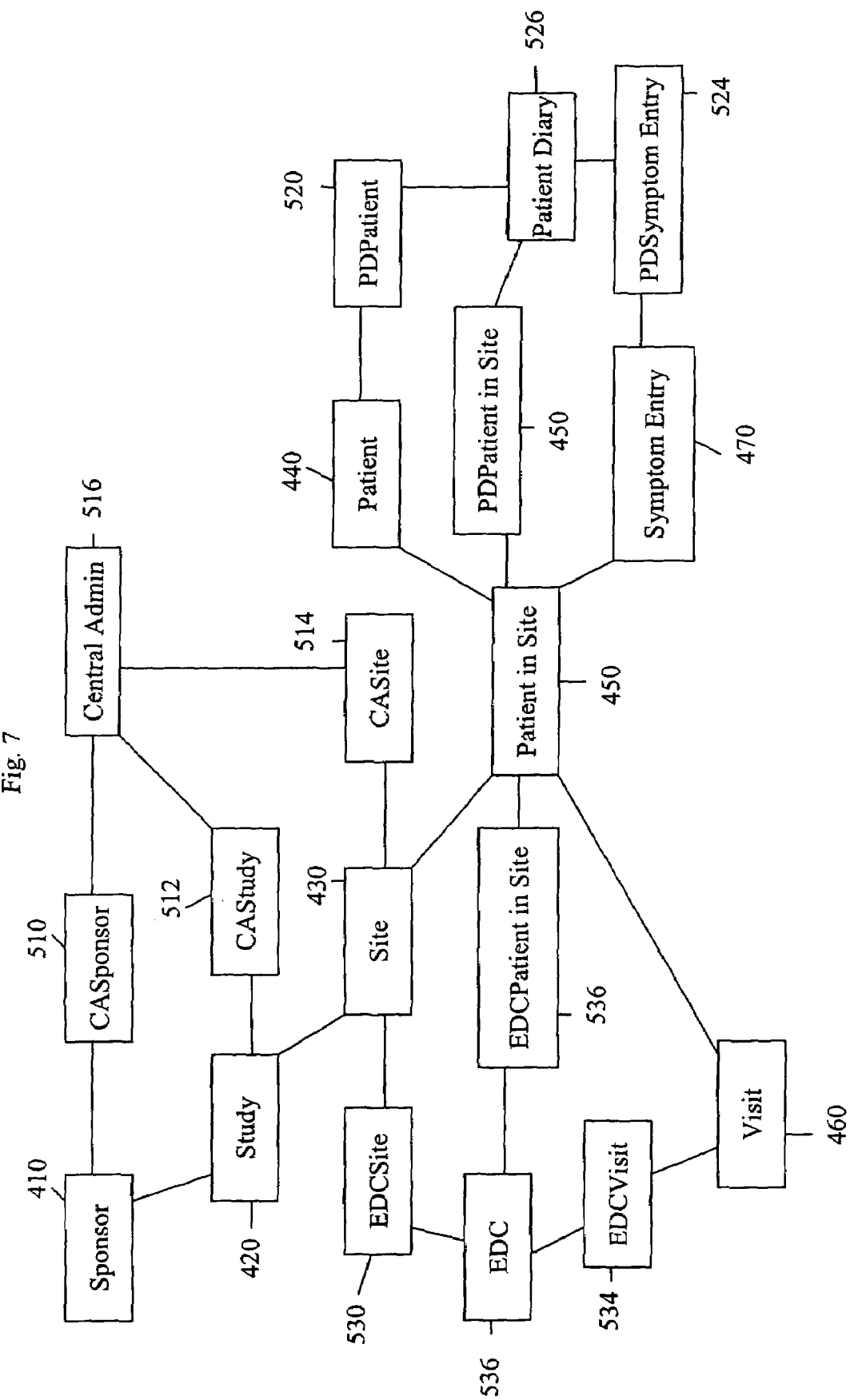
FIG. 7 is an exemplary diagram of data structure relationships among multiple data sources in accordance with one embodiment of the present invention.

With reference to FIGS. 6B and 6C, similar mapping between DataSourceDim complete sets 360 and 370 and UniDim complete set 310 occurs, with each DataSourceDim therein linked to a corresponding UniDim. In FIG. 7 the mapped relationships illustrated in FIGS. 6A, 6B and 6C are combined. As illustrated therein, certain UniDims (e.g., Patient in Site 450) are mapped to more than one DataSourceDim. This occurs when more than one data source contains information relating to a particular industry business context dimension (as represented by a UniDim).

In an embodiment, each DataSourceDim is a node in the network which defines UniDimNet 210, similar to each node defined by each UniDim. By mapping each DataSourceDim node onto the two dimensional UniDimNet network defined by the UniDims and their relationships with each other, the UniDimNet network is expanded into three dimensions. In this context the UniDimNet 210 is a three-dimensional network of nodes stored as related data in the UniBase 110.

Figure 8:
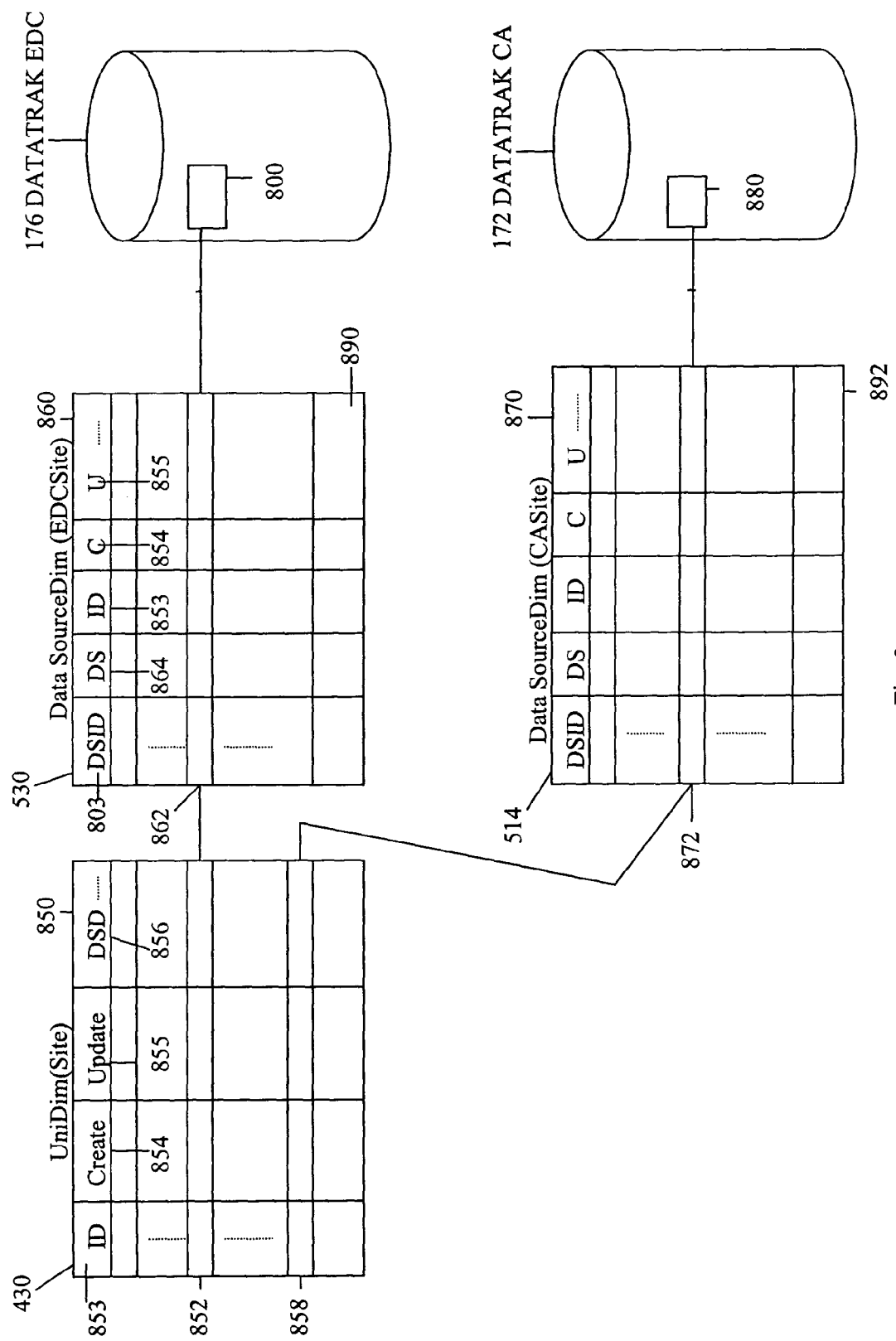
FIG. 8 is an exemplary diagram of tables and table relationships in accordance with one embodiment of the present invention.

In another embodiment, UniDimNet 210 is a series of interrelated tables, with each node in the UniDimNet 210 being represented by a table. As such, each UniDim and each DataSourceDim in the UniDimNet 210 are represented by a table. Each dimension instance in a data source accessible by system 100 is represented by a row in at least one Unidim of the UniDimNet 210 and at least one DataSourceDim of the UniDimNet 210. With reference to FIG. 8, for example, a dimension instance 800 in data source 176 (DATATRAK EDC) is a particular site in a study from which data is captured by DATATRAK EDC (i.e., dimension instance 800 is an instance of industry business context dimension 430 "site"). Dimension instance 800 is represented in table 860 for DataSourceDim 530 ("EDC Site") by row 862 and in table 850 for UniDim 430 ("Site") by row 852.

Each UniDim table contains an entry (e.g., a row in the table) for each dimension instance of the dimension represented by the UniDim which is contained in a data source which is accessible by sytem 100. Each entry (e.g., row 852) in the UniDim table contains a globally unique identification 853 which uniquely identifies the dimension instance represented by the entry. Each entry may also contain a creation timestamp 854 and an update timestamp 855 for each entry, representing the time the dimension instance was entered into system 100 and the last time the dimension instance was updated, respectively. Each entry may further contain additional information (i.e., additional record fields) regarding each dimension instance in the table. Any suitable information may be added. For example, a field 856 identifying the DataSourceDim related to the dimension instance may be added. It will be appreciated that the amount of information contained in each UniDim entry depends upon the response time desired for system 100 and the data storage space available for the UniBase. In general, the more information that is contained in each UniDim entry, the fewer the data source look-ups need to be performed by system 100 (because much of the information regarding the dimension instance will already be stored in the UniDim entry), thus generally speeding up performance of the system. However, such additional information uses additional storage space, which may add to the cost of the system and, depending upon the database management software used to maintain the UniDimNet, may slow the system down if the size of the UniDim tables becomes too large.

Similarly to the UniDim tables, each DataSourceDim table contains an entry for each dimension instance of the dimension represented by the DataSourceDim which is contained in the data source which is related to the DataSourceDim. Each entry (e.g., row 862) in the DataSourceDim table contains a reference 864 to the data source in which the dimension instance is contained, key information 863 (such as a data source unique identifier) required to retrieve the dimension instance (and the data associated therewith) from the data source, and the unique identification 853 for the dimension instance as contained in the UniDim entry relating to the dimension instance. Each entry may also contain a creation timestamp 854 and an update timestamp 855 similarly to the related UniDim entry. Also as with UniDim entries, DataSourceDim table entries may contain additional information relating to the particular dimension instance, and may further contain additional information regarding the data source and the UniDim to which the DataSourceDim is related. It will be appreciated that the same factors relating to speed and size which dictate the amount of information contained within a UniDim entry are also applicable to determining the amount of information contained with a DataSourceDim entry.

With reference again to dimension instance 800, an entry relating to dimension instance 800 is contained in DataSourceDim table 860 (entry 862) and in UniDim table 850 (entry 852). These entries are related to each other by any suitable mechanism. In one embodiment, the relation is contained in a DataSourceDim identifying field 856 of a UniDim record. In another embodiment, the relation is further defined by each entry containing the same UniDim unique identification 853.

A UniDim table may be related to more than one DataSourceDim table. With further reference to FIG. 8, UniDim table 850 is also related to DataSourceDim table 870 representing DataSourceDim 514 ("CA Site"), which is related to data source 172 (DATATRAK CA). For example, dimension instance 880 in data source 172 (DATATRAK CA) is a particular site in a study from which data is stored in DATATRAK CA (i.e., dimension instance 800 is an instance of industry business context dimension 430 "site"). Dimension instance 800 is represented in table 870 for DataSourceDim 514 ("CA Site") by row 872 and in table 850 for UniDim 430 ("Site") by row 858. It will be appreciated that in this example UniDim table 850 contains entries which relate to two different DataSourceDim tables (and subsequently to two different data sources). UniDim table 850 can contain entries which relate to any number of DataSourceDim tables, as long as the dimension instance (to which the DataSourceDim relates) relates to the UniDim (to which the UniDim table relates). Furthermore, a UniDim table can contain multiple entries which relate to multiple entries in a single DataSourceDim table (i.e., representing multiple dimension instances in a single data source). In this event, an entry for each dimension instance will be stored in both the DataSourceDim and the UniDim tables relating to the dimension instance.

With still further reference to FIG. 8, it will be appreciated that each DataSourceDim table also may contain an entry (e.g., 890 for table 860 and 892 for table 870) referring to the data source itself. Such an entry relates to the special DataSourceDim (e.g., with reference to FIG. 5, DataSourceDim 516 ("DATATRAK CA")) which contains information relating to a particular data source. Such an entry may contain information similar to other entries in the database, and optionally may contain additional information relating to a data source (e.g., information relating to the data source's access mechanism or, generally, connection information relating to the data source). Each data source which relates to a DataSourceDim has a special entry in the DataSourceDim which relates to itself. Each DataSourceDim node thus contains information for all real data sources of the corresponding type.

In an embodiment, each dimension instance contained within all data sources accessible to system 100 has a corresponding entry in at least one UniDim table and at least one DataSourceDim table. UniDimNet 210 thus facilitates querying of dimensions and dimension instances spanning all data sources irrespective of the physical and logical structure of each data source. Such queries (relating to dimensions or dimension instances, not to particular data sources or specific records in each data source) may be performed by templates, or UniViews.

Figure 9:
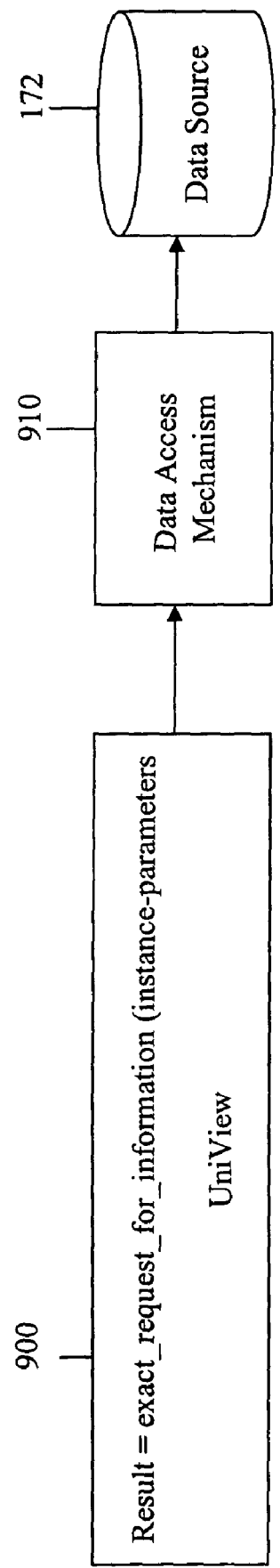
FIG. 9 is an exemplary diagram of a UniView relationship in accordance with one embodiment of the present invention.

A UniView is logic (e.g., a software component, routine or object) which performs an actual data request to a data source within system 100. A UniView is a specific question for a specific dimension designed for a specific data source. With reference to FIG. 9, exemplary UniView 900 communicates with data access mechanism 910 to facilitate access to and query of a data source (here, exemplary data source 172). In an embodiment, a UniView takes the form of a function call:

result=exact_request_for_information (instance_parameter)

wherein "result" is the requested information which is returned from the data source in response to the query, "exact_request_for_information" is the specific request (query) to the data source for specific information, and "instance_parameter" is the specific dimension instance the request regards. For example, a UniView querying for the height of patient "Joe Smith" would define "result" as being a field for containing the value of Joe Smith's height and could take the form of:

result=what is the height of the patient (patient="Joe Smith")

Upon a successful query to the appropriate data source, the exemplary UniView would return the value of Joe Smith's height as recorded in the data source.

In an embodiment, the "result" and the "specific request" of a UniView is created and stored while the "instance parameter" is left as a variable, thus allowing the UniView to be used and reused each time the same question for the same dimension for the same data source is made (a value for the "instance parameter" may be passed to the UniView in order to complete the UniView). In this manner, a single UniView may be selected and passed multiple instance parameters to effectuate multiple queries to the same data source for multiple dimension instances.

Each UniView is created for a specific data source. In an embodiment, upon incorporating a data source into system 100, a plurality of UniViews are created in system 100 for querying the new data source. Each UniView contains the necessary information and instructions to facilitate access to a data source via the data access mechanism for that particular data source. For example, exemplary data sources DATATRAK EDC and DATATRAK CA are accessible via the DATATRAK QUESTIONVIEW API. A UniView for either of these data sources will be created with the ability to access and use the DATATRAK QUESTIONVIEW API for querying each database. The UniView will contain the required parameters, instructions and information necessary to instruct the API to query the databases and return certain results (in the format of "results"). In this sense the UniDimNet 210 is removed from particular details of the structure and physical requirements of each data source. The UniViews receive a dimension-specific query and facilitate access to a data source to respond to the query. While the above example has illustrated use of an API as a data access mechanism to a data source, it will be appreciated that any data access mechanism which is capable of querying a data source may be used.

It will be appreciated that the number and extent of UniViews which are created for any specific data source depends upon the number and type of dimension instances within the data source and a user's desire to query the data source. Any suitable number of UniViews for a particular data source may be created and used in system 100. It will be appreciated that to the extent a data source has voluminous data representing many instances, numerous UniViews will be created. UniViews may be stored in any appropriate element (or database) of system 100 such as, e.g., within UniBase 110. In an embodiment, UniViews (or "definitions" of UniViews) are stored in (with reference to FIG. 2) definition of UniViews database 220 of UniBase 110. In another embodiment, with reference to FIGS. 1 and 12, a plurality of UniViews is stored in UniView Tree 1210 of UniBuilder 160. UniView Tree 1210 may contain a listing of all UniViews created for system 100. The listing may be organized in any suitable manner for facilitating searching of and access to UniViews of the system. In an embodiment, the UniViews in UniView Tree 1210 are topically organized by dimension. In another embodiment, the UniViews are organized first by data source, then by dimension. In yet another embodiment, the UniViews are hierarchically organized. UniBuilder 160 may use manage UniView Tree logic 1220 to facilitate management of the UniView Tree. Manage UniView Tree logic 1220 includes any suitable steps, methods and/or processes for facilitating management of the UniView Tree 1210, including but not limited to logic for adding UniViews to the Tree, deleting UniViews from the Tree, reorganizing the Tree, searching the Tree, structuring the Tree and otherwise facilitating change to the Tree. As also further discussed below, UniView Tree 1210 may also contain UniViewInterfaces and CompoundUniViews. While the UniView Tree 1210 has been described as facilitating organization of the UniViews of a system 100, it will be appreciated that the UniViews themselves may be stored in the UniView Tree 1210 or alternatively may be stored in a different location (or database) with only identifying keys associated with each UniView being organized in the UniView Tree 1210.

System 100 optionally includes additional functions to assist in the management, use and creation of UniViews, including but not limited to using a UniViewInterface, using CompoundUniViews, UniView caching and UniView creation via an automated process such as, e.g., a UniBot. UniViewInterfaces are illustrated with reference to FIG. 10.

A UniViewInterface is a mechanism for combining multiple UniViews to facilitate queries which would require use of multiple UniViews. A UniViewInterface takes generally the same form as a UniView (i.e., a function call) wherein a plurality of UniViews are called by the single UniViewInterface. However, generally the "result" of a UniViewInterface is a result set, the contents of which is a collection (or array or table) of retrieved data which corresponds to a plurality of dimension instances retrieved by the plurality of UniViews which are called by the UniViewInterface. Furthermore, the "exact_request_for_information" in a UniViewInterface is not data source specific, as it is in a UniView. Instead, the "exact_request_for_information" relates only to the information requested (e.g., from a dimension), irrespective of the data source. Still furthermore, the "instance_parameter" is an array of dimension instances, rather than a single dimension instance. The array of dimension instances is defined by the set of dimension instances which are desired to be queried.

Figure 10:
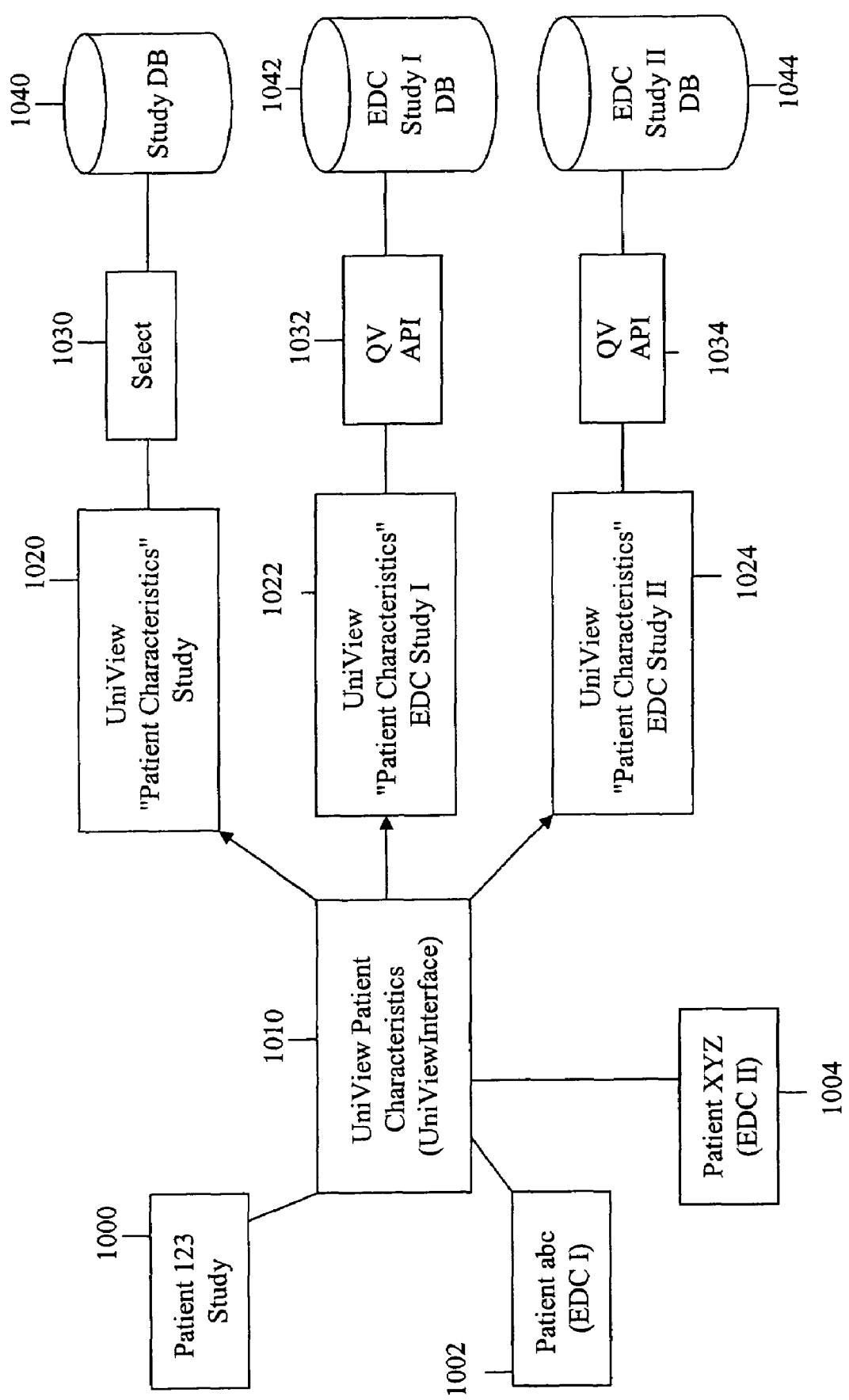
FIG. 10 is an exemplary diagram of a UniViewInterface in accordance with one embodiment of the present invention.

Use of a UniViewInterface is illustrated with reference to FIG. 10. In the example of FIG. 10, three separate data sources (Study DB 1040, EDC Study I DB 1042 and EDC Study II DB 1044), each with different physical and logical structures and employing different access mechanisms, each contain information relating to the dimension "patient characteristics" (such as, e.g., the age, height, weight, etc. of the participants in each study). A UniView may be used to query each database individually for a single dimension instance. When multiple dimension instances occur within each data source, multiple UniViews would need to be used to access each instance. The number of UniViews required to fully query all three data sources would be time consuming for a user to implement. A UniViewInterface 1010 facilitates multiple UniView querying with a single user query.

UniViewInterface 1010 is created with "result" as a collection for containing patient characteristic information for a plurality of patients. The "result" of a UniViewInterface 1010 query will be a collection of patient characteristics data, with each patient being an entry in the "result." The "exact_request_for_information" is a query of the dimension "patient" 440 (with reference to FIG. 4) for patient characteristics (it does not specify a particular data source). The "instance parameters" is an array of patient names or other suitable patient identifiers. For a user who is desirous of receiving patient characteristics for patient 123 1000 (from Study), patient abc 1002 (from EDC I) and patient xyz 1004 (from EDC II), the user passes the identifiers (e.g., the names) of patient 123, patient abc and patient xyz to the UniViewInterface 1010 as values of the array "instance parameters" (i.e., the patients to be queried are passed to the UniViewInterface). Of note, the user does not need to pass the identity of the data source of each patient to the UniViewInterface. Upon receiving values in array "instance parameters," the UniViewInterface 1010 queries the UniDim in the UniDimNet 210 which corresponds to the dimension "patient" (the UniViewInterface has been coded to search this dimension as the UniViewInterface 1010 is for "patient characteristics") based upon or for the unique identification of each dimension instance in the array. Once the UniViewInterface 1010 obtains this information for each dimension instance, the UniViewInterface 1010 queries the DataSourceDim associated with each dimension instance (note: once the instance is found in the UniDim an association for the respective DataSourceDim already exists) to determine the proper data source associated with each dimension instance. With this information, the UniViewInterface 1010 calls multiple UniViews. Each called UniView is passed a single "instance_arameter" as a single instance from the array of "instance_Parameter" of the UniViewInterface 1010, and the UniView to which the single instance is passed is selected by the nature of the UniViewInterface (i.e., it is a UniView for "patient characteristics," exactly as the UniViewInterface) and the identity of the related data source. In the example, UniViewInterface 1010 thus calls UniViews 1020, 1022 and 1024 for, respectively, patient 123, patient abc and patient xyz. UniView 1020 accesses data source 1040 via access mechanism 1030, UniView 1022 accesses data source 1042 via access mechanism 1032 (e.g., the DATATRAK QUESTIONVIEW API) and UniView 1024 accesses data source 1044 via access mechanism 1034. The resulting collection of patient characteristic data is returned to the user in response to the UniViewInterface query. In an embodiment, authored UniViewInterfaces of system 100 are stored and/or organized in UniView Tree 1210. UniViewInterfaces are examples of complex queries.

Figure 11:
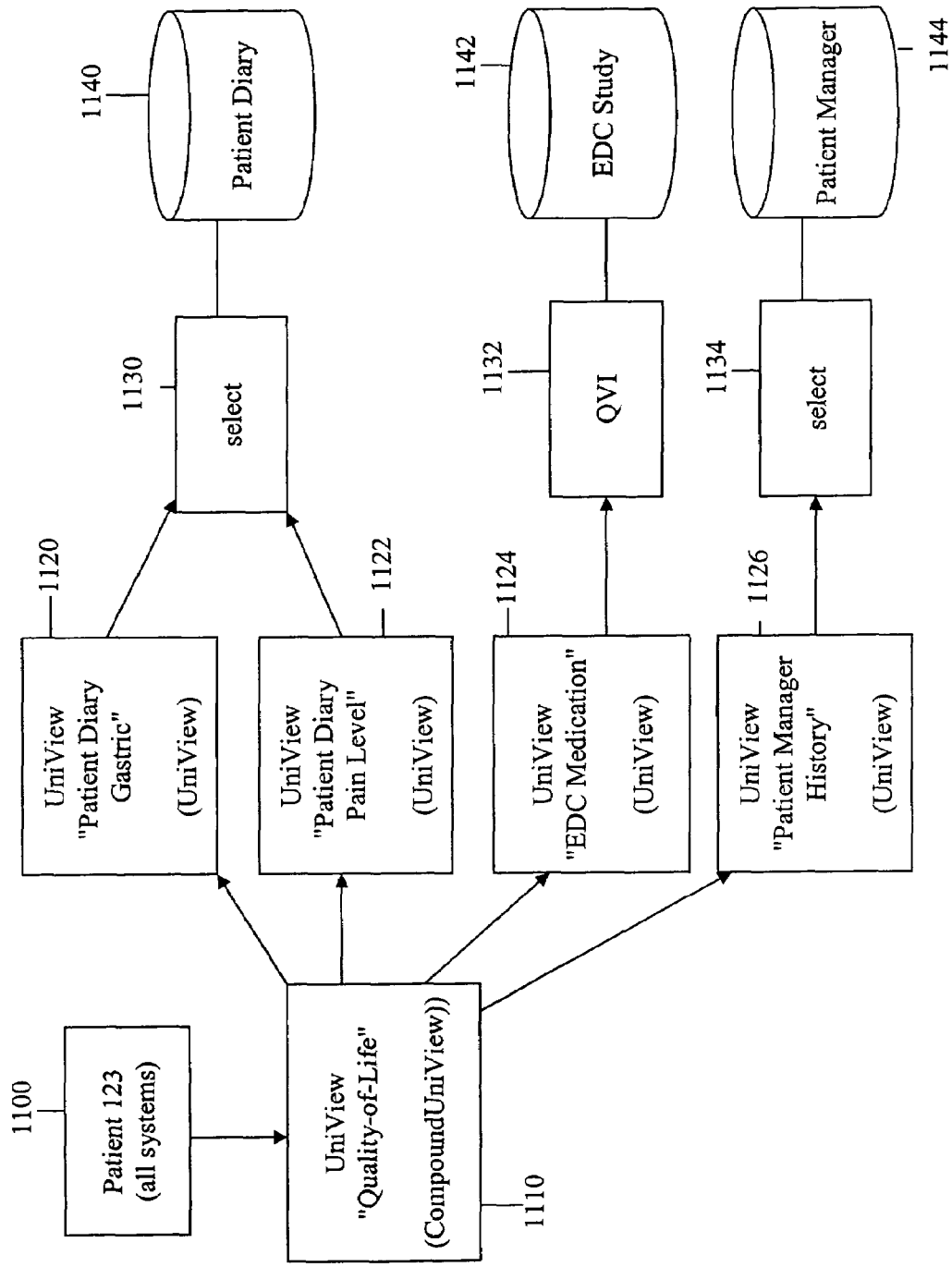
FIG. 11 is an exemplary diagram of a CompoundUniView in accordance with one embodiment of the present invention.

With reference to FIG. 11, a CompoundUniView is a mechanism for storing for future use a series (or combination) of UniViews. It may be desirous for a user to create a complex query in which multiple UniViews spanning multiple dimensions and multiple data sources are used. Once created, such a complex query (comprising multiple UniViews) can be stored as a CompoundUniView and subsequently used with different inputted instance parameters. In the example of FIG. 11, a user desires a "quality of life" query across all data sources for a particular patient. The user defines the "quality of life" query as including "patient diary gastric" and "patient diary pain level" from data source patient diary 1140, "EDC medication" from data source 1142 and "patient manager history" from data source 1144. The user thus combines four UniViews to create this complex query. The user selects UniViews 1120 and 1122 to use access mechanism 1130 to query data source 1140, UniView 1124 to use access mechanism 1132 to query data source 1142 and UniView 1126 to use access mechanism 1134 to query data source 1144. This complex query is saved as CompoundUniView "Quality of Life" 1110. When a subsequent user is desirous of querying system 100 for the "Quality of Life" of a particular patient, the user need only select CompoundUniView "Quality of Life" 1110 and pass to it the desired value of the instance_parameter (e.g., "patient 123" 1100). The CompoundUniView 1110 assembles UniViews 1120, 1122, 1124 and 1126, passes to each of them the instance_Parameter, receives the "result" from each, and returns as a "result" the combined information returned by each UniView. In this sense, the only input parameters (i.e., data provided by a user to define a query or the scope of the query) required from a user for a CompoundUniView is the identity of the CompoundUniView (i.e., the description of the data to be queried, e.g., "weight of patient") and the identity of the dimension instance(s) to be queried. A user may also input a parameter regarding the result desired (i.e., the format of the returned data). In an embodiment, authored CompoundUniViews of system 100 are stored and/or organized in UniView Tree 1210. CompoundUniViews are examples of complex queries.

UniView caching is a mechanism for speeding up system 100 response time by caching the results of executed UniViews. In subsequent executions of such UniViews, the cached results are analyzed to determine if an update to the corresponding data source has occurred since the time of the caching. Generally speaking, if no update has occurred, the cached results can be returned for the execution of the UniView, thus saving the time and system resources required for accessing the data source directly in response to the UniView. If an update has occurred, the cache is ignored, the UniView queries the data source, and the response to the query is cached over the old cached data.

To facilitate such caching, in an embodiment, system 100 creates a cache results table for each UniView of system 100. The cached results tables may be stored in any suitable location within system 100. In an embodiment (with reference to FIG. 2), UniBase 110 has a cached UniView results database 230. Database cached UniView results 230 is any suitable database, with any suitable organization, for storing cached results from UniView queries. In an embodiment, cached UniView results database 230 contains a plurality of tables, each table being associated with a specific UniView of system 100. Each table contains the "result" data from the most recent query executed by the UniView associated with the table. In an embodiment, each caching instance in a table is appended with a time stamp which indicates the date and time the data was cached. An exemplary system use of UniView caching will be described further below. In an embodiment, creation of the cached results tables is facilitated by (with reference to FIG. 12) UniView table logic 1250 of UniBuilder 160 (discussed in more detail immediately below with regard to UniView creation). UniView table logic 1250 includes any suitable steps, processes, method and/or software code to facilitate creation of, access to and management of the cached results tables.

Figure 12:
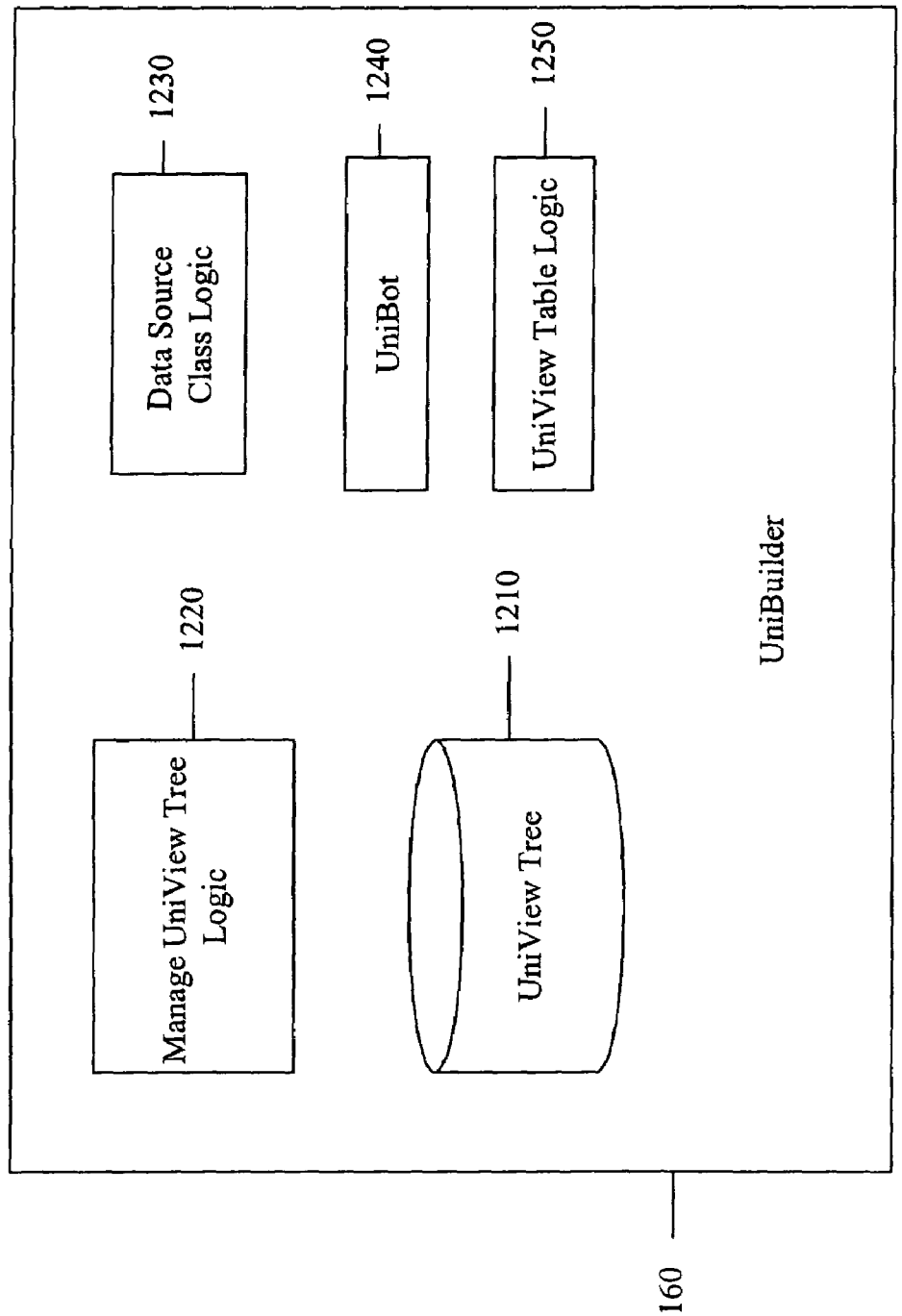
FIG. 12 is an exemplary diagram of a UniBuilder in accordance with one embodiment of the present invention.

UniView creation can be afforded by any suitable mechanism, including manually (i.e., a single UniView is coded by a user). In an embodiment, system 100 provides tools to assist in the creation of UniViews. With reference to FIG. 12, UniBuilder 160 includes data source class logic 1230 and UniBot 1240.

In an embodiment, data source class logic 1230 assists in creation of UniViews. Upon becoming accessible to system 100, a data source class is defined which sets forth the necessary information, steps, processes and access mechanisms for querying data source(s) of that class. The data source class contains information required by a UniView to create the "exact_request_for_information" element of the UniView (i.e., the specific information required by the UniView to facilitate a query to the data source via an appropriate data access mechanism). This information is formatted to facilitate use in a UniView directed to querying a data source of this class. In this manner, when it is desirous to create a UniView which queries a data source of this class, the author of the UniView can "port" or "copy" the formatted data class information into the UniView, thus saving time in re-creating the same code for each such UniView. To facilitate the creation of the data source class, (with reference to FIG. 1), UniBuilder 160 receives information regarding data source(s) from data source 130. Data source class logic 1230 includes any suitable steps, methods, processes and/or code to facilitate creation of a data source class, formatting of a data source class, storage of a data source class, access to a data source class, and porting of a data source class to a UniView. Data base class information may be stored in any suitable location of system 100.

In an embodiment, UniBot 1240 facilitates generation of a set of "standard" UniViews for a data source. UniBot 1240 includes any suitable steps, methods, processes and/or code to facilitate such generation. UniBot 1240 may optionally be automated. Based upon user input regarding what a "standard" set of UniViews includes (e.g., how may UniViews for a data source of such a class; which dimensions are to be queried; what data is routinely queried from data sources of such a class; etc.), UniBot 1240 accesses the relevant data source(s) and determines the information necessary to create a standard set of UniViews. In an embodiment, UniBot 1240 access the relevant data sources and determines the information necessary to create the DataSourceDims for the data source for incorporation into a UniDimNet. In a embodiment, UniBot 1240 retrieves such information and creates a set of UniViews according to user-defined specifications.

Figure 13:
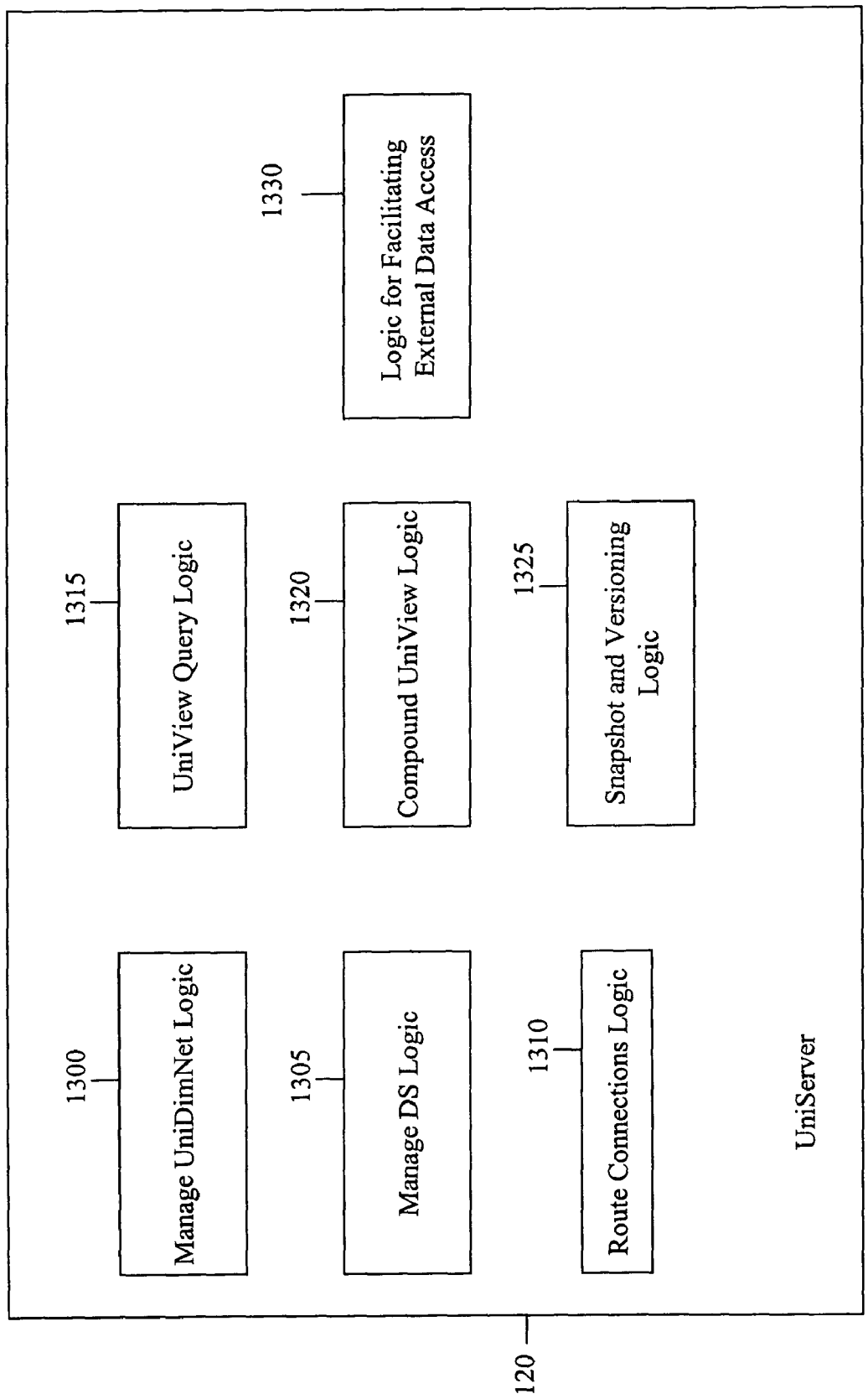
FIG. 13 is an exemplary diagram of a UniServer in accordance with one embodiment of the present invention.

With reference to FIG. 1, coordination among and between UniBase 110, UniBuilder 160, data sources 130 and other system 100 elements (discussed below) is facilitated by UniServer 120. With reference to FIG. 13, UniServer 120 optionally includes manage UniDimNet logic 1300, manage data source logic 1305, route connections logic 1310, compound UniView logic 1320, snapshot and versioning logic 1325 and logic for facilitating external data access 1330. It will be appreciated that UniServer 120 can optionally contain additional elements as necessary to facilitate operation of system 100.

In an embodiment, manage UniDimNet logic 1300 facilitates management of the UniDimNet. Manage UniDimNet logic 1300 includes any steps, processes, methods and/or software code to facilitate adding, updating and deleting Uni-Dims and DataSourceDims from the UniDimNet, distributing UniDimNet structure to the UniBase, and other actions relating to the UniDimNet not otherwise facilitated by other elements of system 100. In an embodiment, manage data source logic 1305 facilitates management of the data sources accessible to system 100. Manage data source logic 1305 includes any steps, processes, methods and/or software code to facilitate management of the data sources and the relationships (including interactions) with the dimensions. In another embodiment, route connections logic 1310 manages connections between elements of system 100. Route connections logic 1310 includes any steps, processes, methods and/or software code to facilitate the routing of connections (including communications) between system 100 elements, including but not limited to the UniBase, the data sources and any user(s).

Figure 14:
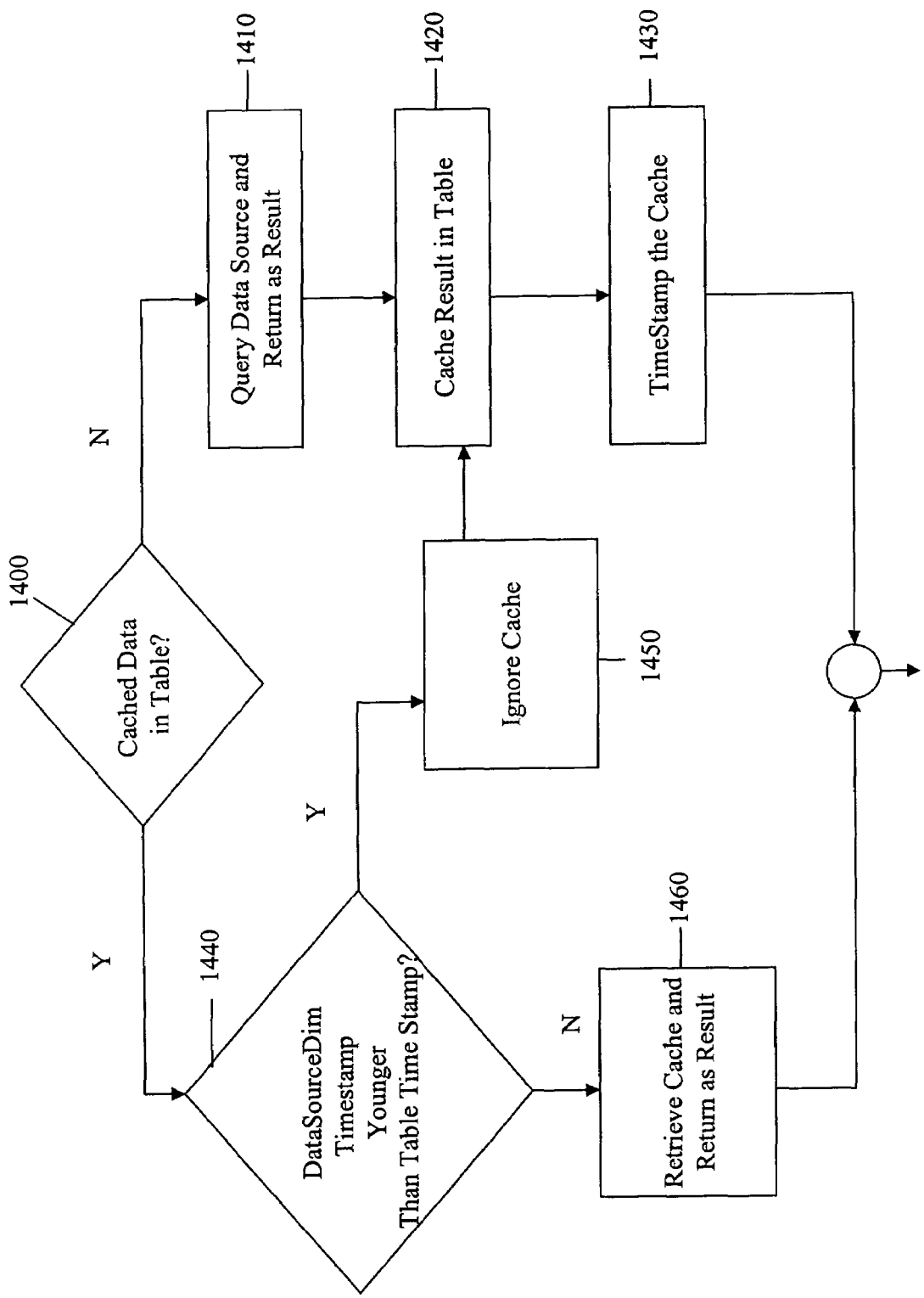
FIG. 14 is an exemplary flowchart of data retrieval method in accordance with one embodiment of the present invention.

In a further embodiment, UniServer 120 optionally includes UniView query logic 1315 for coordinating system 100 actions and interaction during execution of a UniView. UniView query logic 1315 includes any steps, processes, methods and/or software code to facilitate coordination of system 100 resources during execution of a UniView. In an embodiment, UniView query logic 1315 is configured to facilitate one or more than one of the following UniView execution configurations: (1) ShowSourceBasedDataOnly. Under this configuration (exemplified in FIG. 14), a UniView will first check its associated table to determine if data is already cached in the table (step 1400). If no data is cached, the UniView queries the appropriate data source and returns a result therefrom (step 1410). The resulting data is cached (step 1420) and a timestamp for the cache is set (step 1430). If data has been cached, the time stamp of the cached data is compared to the time stamp of the corresponding Data-SourceDim (step 1440). If the DataSourceDim time stamp is younger than the cached time stamp, the cache is ignored (step 1450) and the UniView queries the data source (step 1410). In the alternative, the cached data is retrieved (step 1460) and a query to the data source is not necessary. (2) ReceiveAlwaysFromDataSource. Under this configuration, a UniView will always query a data source for a result, and does not check its associated table for cached data. (3) ShowUniBaseDataOnly. This is the opposite configuration from ReceiveAlwaysFromDataSource. Under this configuration, the UniView will always use cached data in the table, even if it is out of date. Under this configuration the UniView does not query the data source. (4) ShowUnstableData. Under this configuration, the UniView will first check its associated table for cached data. If cached data exists, it will be returned as a result even if out of date. The UniView will continue processing in the background, similarly to the process set forth for ShowSourceBasedDataOnly, and will revise the returned result with data from the data source if the cached data is out of date. If, upon initial checking of the table, no cached data exists therein, the UniView will continue its background processing (i.e., it will query the data source). (5) DefaultBehavior. Under this configuration, the UniView itself contains code designating how it should process its query. In this instance, UniView query logic 1315 follows the steps contained in the UniView. While certain alternative configurations for UniView query logic 1315 have been set forth herein, it will be appreciated that any suitable configuration for UniView query logic 1315 may be used.

In an embodiment, compound UniView logic 1320 facilitates processing of a CompoundUniView. Compound UniView logic 1320 includes any steps, processes, methods and/or software code to facilitate processing (execution) of a CompoundUniView. Particularly, compound UniView logic 1320 manages execution of a CompoundUniView and further acts as a virtual data source therefore. For each UniView which is called by a CompoundUniView, compound UniView logic 1320 performs a table cache check and (depending upon the nature of the cached data, if any) a data source query similarly to steps illustrated above for ShowSourceBasedDataOnly. While compound UniView logic 1320 has been described herein with relation to a ShowSourceBasedDataOnly configuration, it will be appreciated that compound UniView logic 1320 may be configured to follow any suitable configuration.

In an embodiment, snapshot and versioning logic 1325 facilitates retaining "snapshots" of UniView query results and further facilitates labeling such snapshots with version identifiers. Snapshot and versioning logic 1325 includes any steps, processes, methods and/or software code to facilitate creating snapshots and versions of UniView query results. When a UniView query result is returned, it is optionally stored in a table corresponding to the UniView in the UniBase. Under one optional configuration of the UniServer, this cached data is overwritten the next time the same UniView returns an updated result from a query. Snapshot and versioning logic 1325 optionally allows any cached data to remain in the table. In an embodiment, a particular cached result is stored as an entry (e.g., a row) in the cache table. Snapshot and versioning logic 1325 facilitates subsequent returned results being stored as additional row(s) in the cache table. Furthermore, such cached results can be labeled with versioning identifiers to facilitate version comparisons. In this regard, multiple "snapshots" (i.e., former returned results from earlier executions of the UniView) are retained in the cache table, and may be compared to each other (e.g., for version comparision).

In an embodiment, logic for facilitating external data access 1330 facilitates access to system 100 by an external application, such as an OLE database data provider or an ODBC source. Logic for facilitating external data access 1330 includes any steps, processes, methods and/or software code to facilitate such access by an external application. In this regard system 100 can be used to function as a direct data supplier for queries from third-party systems. In an embodiment, such systems need not be configured in any specific way (other than enabling an ODBC connection, for example) to be able to access the data sources of system 100 and the querying power of system 100.

Figure 15:
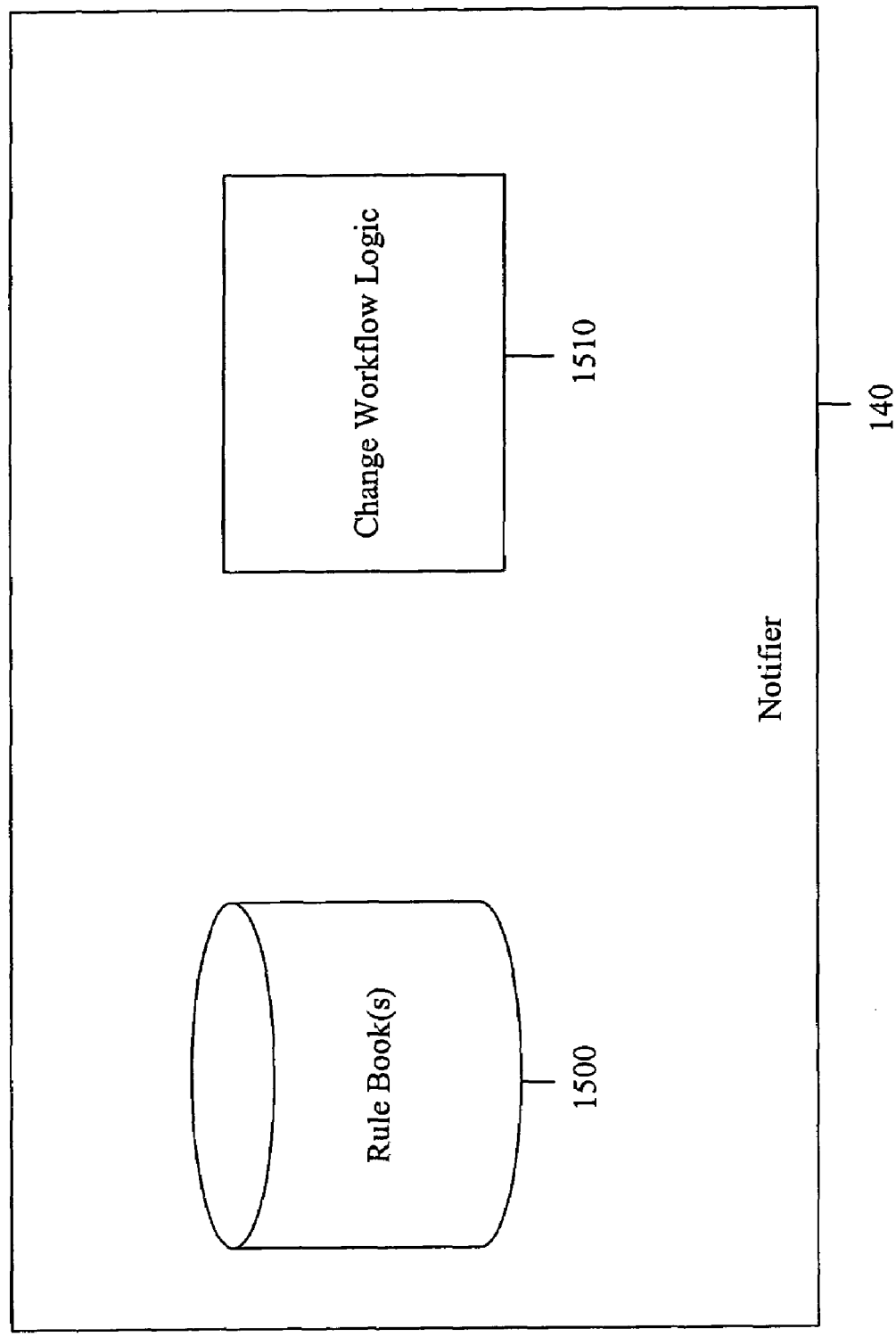
FIG. 15 is an exemplary diagram of a notifier in accordance with one embodiment of the present invention.

The dimension instances in the data sources are rarely static. To incorporate changes made to a dimension instance in a data source, system 100 optionally includes (with reference to FIG. 1) notifier 140 which communicates with UniServer 142 regarding changes which occur to dimension instances in the data sources 130. With regard to FIG. 15, notifier 140 optionally includes a rule book 1500 and change workflow logic 1510. Rule book 1500 is a data base which contains rules associated with each data source which is accessible by system 100. For each data source, the associated rules define the necessary steps to be taken by the system to incorporate a change in a dimension instance (e.g., an addition, a deletion or a modification) into the system (e.g., into the UniDimNet). The rule(s) for any data source are any suitable rules to facilitate integration of the dimension instance change into system 100. In an embodiment, the rules define the minimum required information which must be retrieved from the dimension instance and passed into the system 100 for integration. Generally speaking, such information is retrieved from data source 130 by notifier 140 and passed to UniServer 120 for assimilation into system 100. The rules for a data source may be arbitrarily complex, ranging from minimum (e.g., a select of the unique identification of the dimension instance) to an involved complexity (e.g., using a cascading set of queries to automatically fill a complete dimension hierarchy for the data source). Furthermore, the rules may designate that any time stamps in system 100 for the dimension instance be updated upon a modification.

Change workflow logic 1510 optionally facilitates triggering of notifier 140 and referral to rule books 1500. Change workflow logic 1510 includes any steps, processes, methods and/or software code to facilitate triggering of notifier 140 and referral to rule books 1500. Any change to a dimension instance can be considered a "triggering event" which triggers notifier 140, and, specifically, change workflow logic 1510. It will be appreciated that a triggering event may include but not be limited to creation of a dimension instance, deletion of a dimension instance or any change to a property of a dimension instance, including the value of any data therein. Upon occurrence of a triggering event, change workflow logic 1510 is triggered. Change workflow logic 1510 accesses rule books 1500 to determine what workflow steps are to be implemented in order to assimilate the modified dimension instance into system 100. Change workflow logic 1510 performs and/or facilitates all steps set forth in the rule book to incorporate the modified instance into system 100. While change workflow logic 1510 has been illustrated as an element of system 100 outside of the UniServer 120, it will be appreciated that change workflow logic 1510 (and all of notifier 140) can optionally be included in UniServer 120.

User access to and use of system 100 can be achieved by any suitable user interface. In an embodiment, with reference to FIG. 1, system 100 further includes UniViewer 150. UniViewer 150 facilitates user access to system 100. Particularly, UniViewer 150 allows users to formulate queries to system 100 by combining UniViews, dimensions and dimension instances to form simple or complex queries. Generally speaking, UniViewer 150 is a graphical environment wherein queries are constructed by dragging query components (dimension(s) and UniView(s)) onto a "result" area and results are viewed in the result area by selecting particular dimension instances.

With reference to FIGS. 16 through 19, an exemplary UniViewer 150 is illustrated. Upon launch of UniViewer 150 by a user, the user initially determines whether to work with an existing query or whether to begin a new query. If an existing query is selected, the query (and result(s), if any) is retrieved and displayed by the graphical user interface (GUI). If a new query is desired, the user selects at least one industry business context dimension with which to begin the query.

Figure 16:
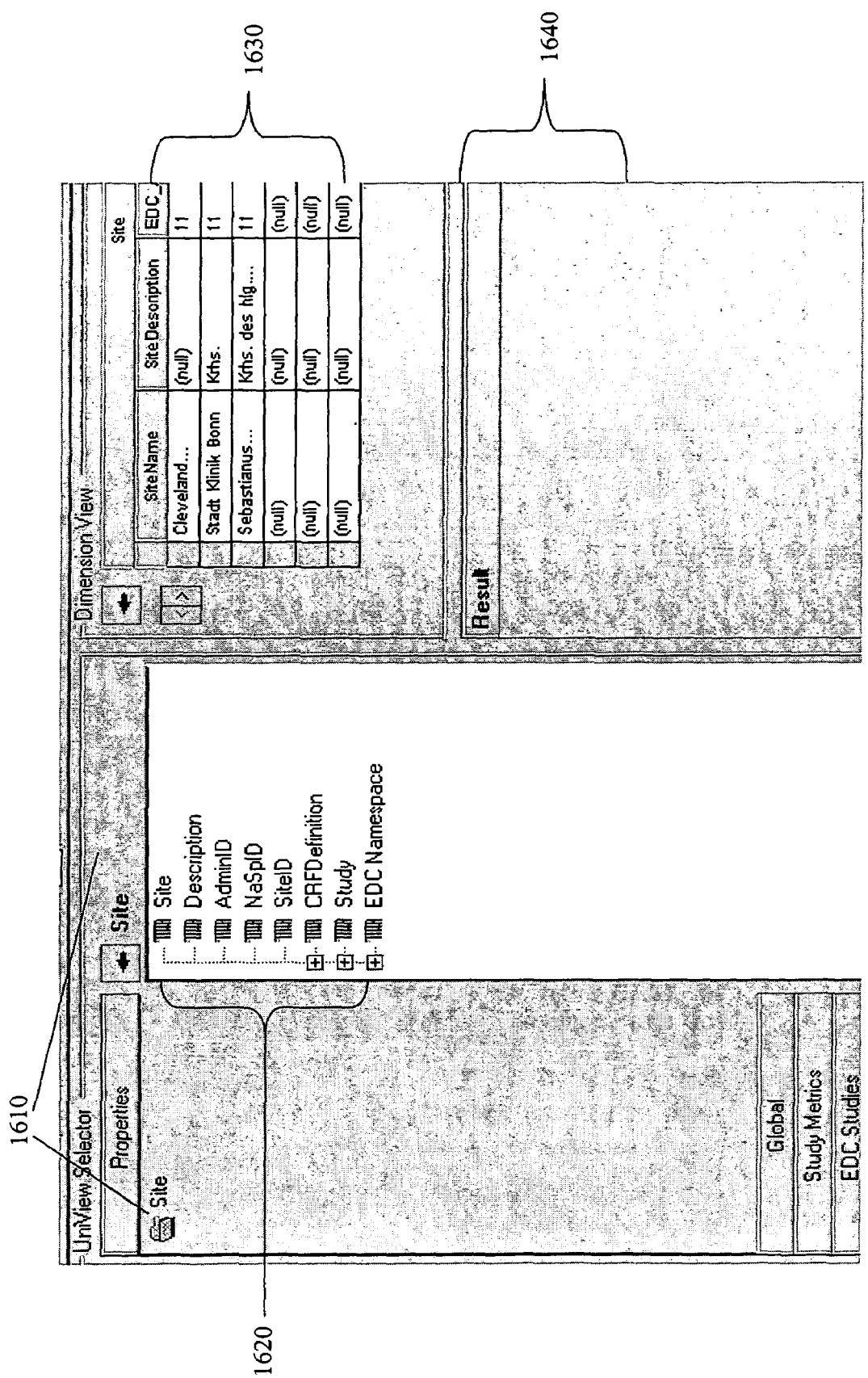

With reference to FIG. 16, an exemplary GUI is displayed. User-selected dimension "site" 1610 is displayed and all UniViews 1620 available for querying dimension "site" are displayed. In this example, UniViews 1620 "EDC Namespace," "Study" and "CRFDefinition" are groups of UniViews (as designated by the "+" to the left of each identifier) while the remaining identifiers relate to individual UniViews. Upon the user selecting at least one dimension at the beginning of this user-session, UniViewer 150 displays 1630 each dimension instance which is contained in the UniDim which relates to the selected dimension. Any suitable process for retrieving such instances may be used. In an embodiment, the UniServer access the unique identifications for each instance as listed in the UniDim for the selected dimension. Upon retrieving the unique identifications, the UniServer can retrieve the dimension instances and display them at 1630. A result area 1640 (currently empty) is also displayed.

Figure 17:
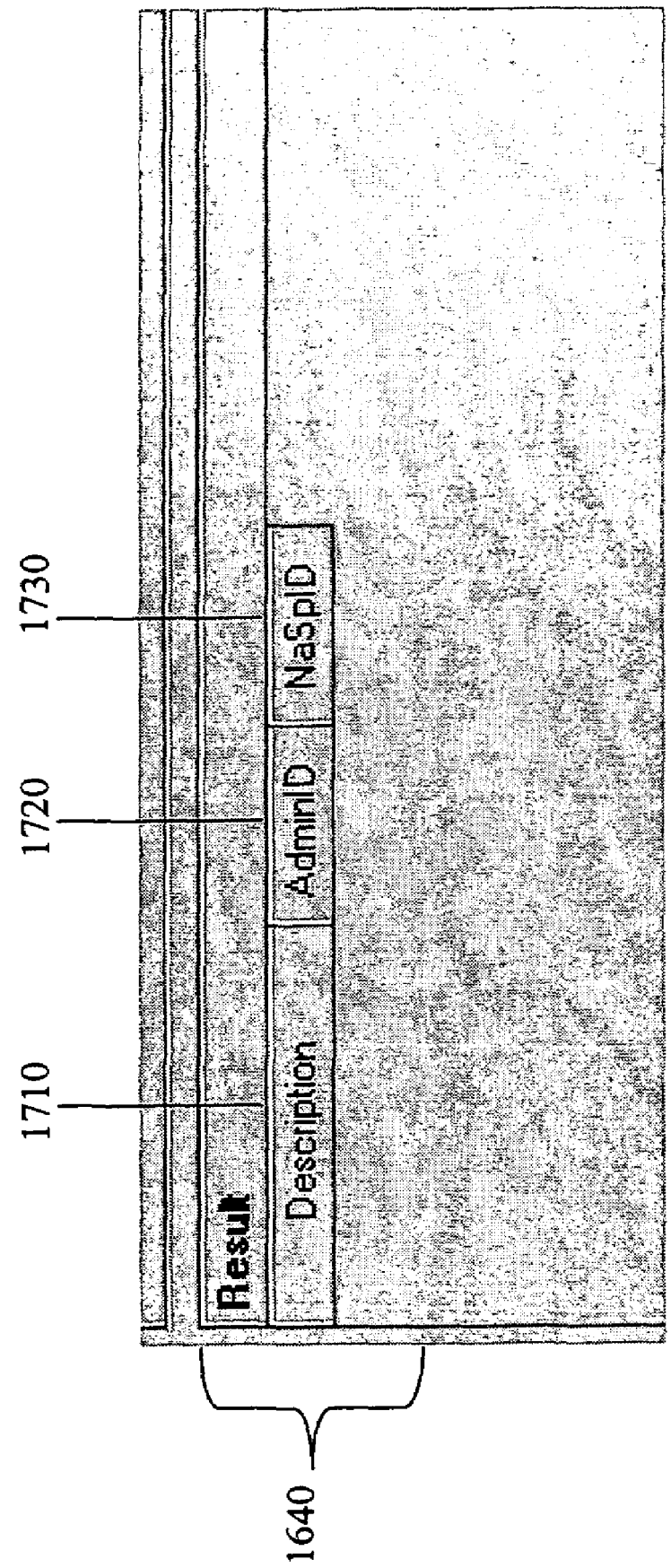

With reference to FIG. 17, the user selects any number of UniViews with which to query the data source(s). In FIG. 17, the user has selected the UniViews "Description," "AdminID" and "NaSplD," which have been dragged onto results area 1640. Upon receiving each dragged UniView, results area 1640 creates a column for the anticipated "result" of the UniView. In FIG. 17, results area 1640 displays a description column 1710 for the results of the "description" UniView, an AdminID column 1720 for the results of the "AdminID" UniView, and an "NaSplD" column 1730 for the results of the "NaSplD" UniView. Of note, dragging multiple UniViews onto the results area 1640 exemplifies a complex query.

Figure 18:
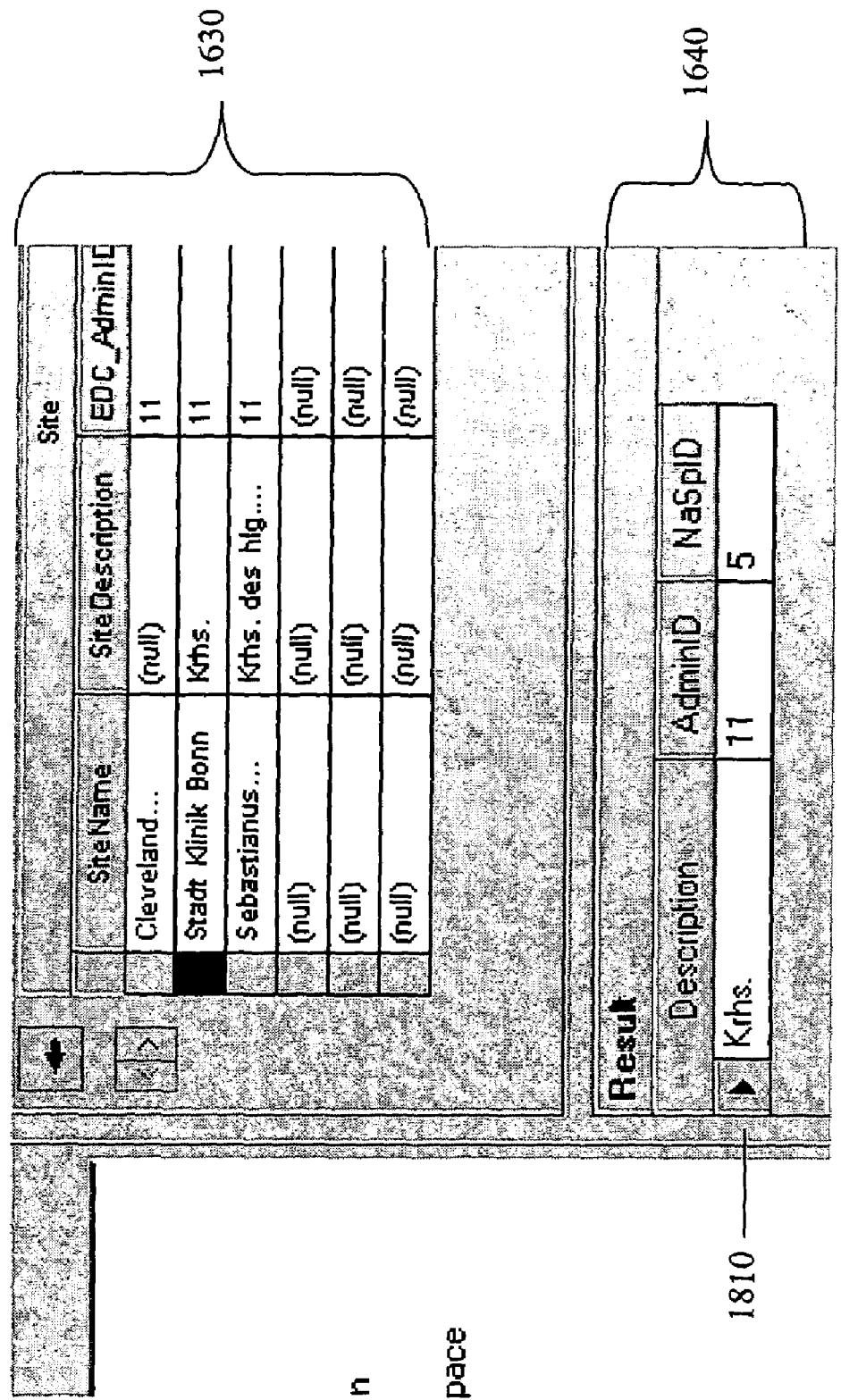

Once the query has been defined by the user by selecting UniView(s), with reference to FIG. 18, the user may select one or more dimension instances 1630 to pass to the queries in the results area 1640 (of note, passing more than one dimension instance exemplifies a complex query). In FIG. 18, the user has selected the "Stadt Klinik Bonn" instance. Upon selection of this instance, the UniViewer 150 passes this instance to the UniServer. The UniServer facilitates execution of the query. The result of each UniView query, upon return of results, is displayed 1810 in results area 1640 (i.e., the result of the "Description" UniView is "Krhs.", the result of the "AdminID" UniView is "11" and the result of the "NaSplD" UniView is "5").

While the above example has been illustrated with UniViews which represent properties of the dimension selected (e.g., each of the three selected UniViews returned properties of the dimension selected—"site"), it will be appreciated that selectable UniViews (1610) may have multiple ways of being associated with the selected dimension. For example, with reference to FIG. 19, a study-specific UniView (as compared to a site-specific UniView) is selected. The selected study-specific UniView 1920 "Visit Date" is connected to a dimension lower in the UniDimNet hierarchy than "site." As such, the selected UniView can be configured to retrieve its data in different ways (because in the hierarchical UniDimNet the "higher" UniDim "site" can be associated with one to many "lower" UniDims "visit date"). For example, the user can select to query visit dates for a particular visit (e.g., "visit 2") or for multiple visits with the multiple visits shown in columns or rows in the results area 1640. In an embodiment, such different ways can be selected by the user by right-clicking on the selected UniView and selecting the desired "way" from a menu of possible "ways."

With reference to FIG. 19, in this example the user has selected to query visit dates for a particular visit ("visit 2"). The result area 1640 is extended to include the column "visit_data_visit_2" 1910 which contains the results returned by the UniView discussed above. It will be appreciated that additional UniViews may be added, subtracted or modified in the UniViewer in order to interactively query the data sources with different complex queries.

While UniViewer 150 has been described with reference to the GUI created by system 100, it will be appreciated that any appropriate steps, methods or logic may be implemented by system 100 to facilitate the GUI of UniViewer 150 and the results of any user query made therewith. In an embodiment, while system 100 is running, the UniDimNet is loaded into memory (e.g., RAM). When a user initially selects a reference (start) dimension for a new query, a "results set" object is created and attached to the selected dimension in the UniDimNet. The "results set" object may be any suitable object, including a collection, table or an array, and may be "zeroed out" (i.e., empty) upon creation. Upon dragging a UniView onto the results area, the results set object may be modified accordingly. For example, depending upon the dimension context of the UniView, the result set object may be repositioned within the UniDimNet. In this example, if the UniView returns "visit information" and is dragged onto a "patient" dimension (as selected by the user), the result set object will be moved to a "lower" level (assuming the hierarchy of the UniDimNet defines the UniDim "patient" as being higher than "visits," which will occur if "patient" is defined as having one to many "visits"). As the UniView is dragged onto the results area, columns (e.g., 1710, 1720 and 1730 with reference to FIG. 17) are added to the results set object (exemplifying a complex query). The columns are defined by the returned "result" from each UniView dragged onto the results field. To provide the information returned from the UniView query (after a dimension instance is subsequently selected by the user) into the results set object (and thus displayed to the user by the GUI), the columns of the results set object are mapped directly to the columns of the table which contains the results of the UniView query. The resulting data in the results set object is displayed in the results area of the GUI.

Figure 20A:
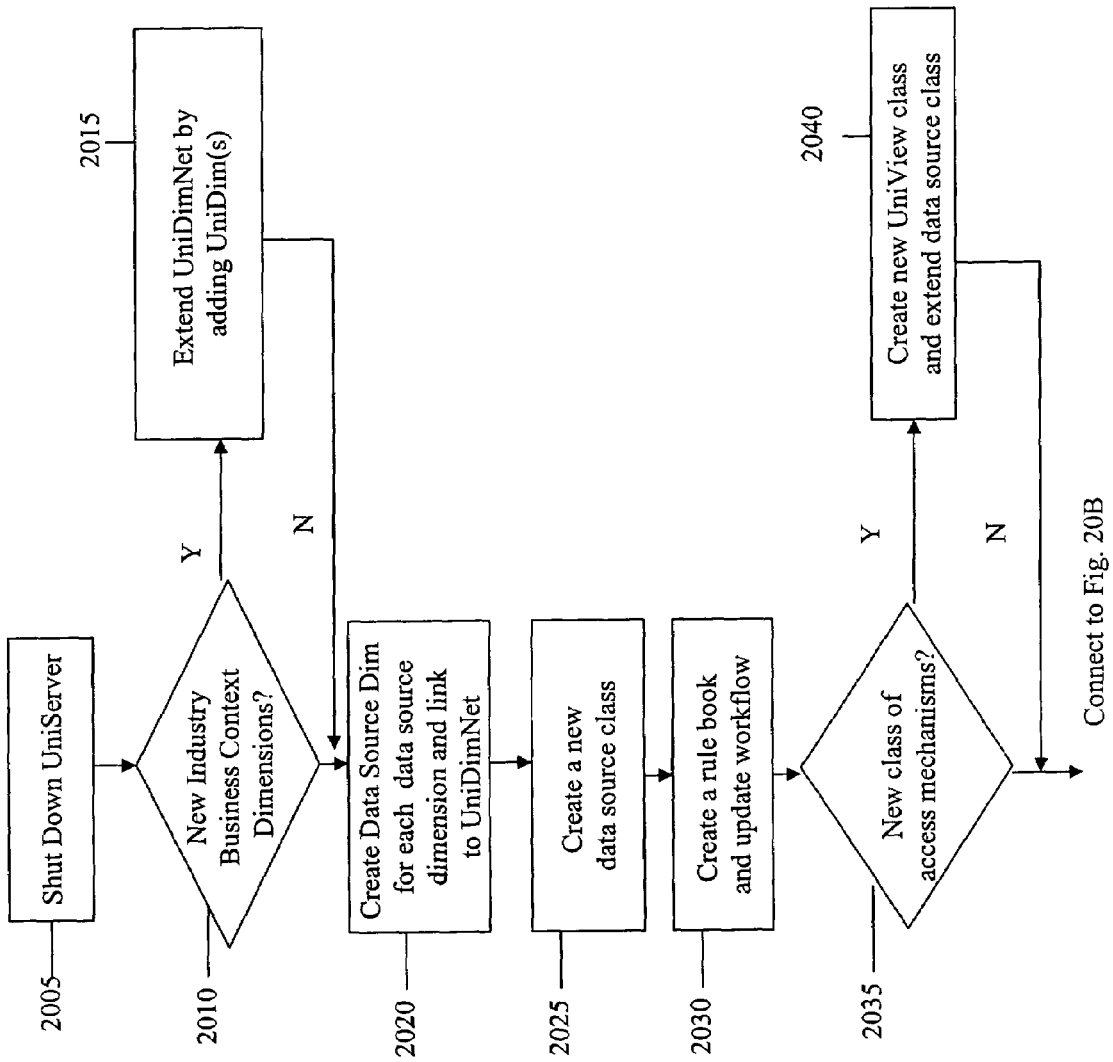

It may be desirable during use of system 100 to add an additional data source or data sources to system 100. In this event, system 100 is modified in any suitable manner to accommodate the addition of such new data source(s). In an embodiment, with reference to FIGS. 20A and 20B, an exemplary procedure for incorporating addition data source(s) is illustrated. At 2005, the UniServer is shut down. At 2010, a determination is made as to whether the addition of the new data source(s) necessitates the addition of any new industry business context dimension(s) to the UniDimNet. If additional dimensions are necessary or otherwise deemed desirable, the UniDimNet is extended at 2015 to include a new UniDim for each new dimension, and to revise any existing UniDims accordingly. After adding the new UniDim(s) (or if no new UniDim(s) are added), at 2020 a DataSourceDim is created for each data source dimension in the additional data source(s) and all new DataSourceDims are linked accordingly into the UniDimNet. At 2025 a new data source class is optionally created, particularly if assistance from the UniBuilder in creating UniViews (e.g., with UniBot) is desired. At 2030 a rule book and update workflow is created and stored in system 100. At 2035 it is optionally determined whether the new data source(s) require a new class of data access mechanisms. If so, a new UniView class is created to encapsulate the access mechanisms required to query the data source(s), particularly if assistance from the UniBuilder in creating UniViews is desired, and the data source class created in 2025 is modified in accordance with the new UniView class.

After creation of the new UniView class (or if such class was not created), at 2045 the UniServer is restarted. At 2050 UniViews for the new data source(s) are created by any suitable means, including manually or with assistance from the UniBuilder (particularly the UniBot if new UniView classes have been created). At 2055 the new UniViews are included in the UniView Tree. At 2060 the new data source instances are registered with system 100, including registration and storage of all required information regarding each instance in the UniDimNet. The Notifier will react to the new instances (not shown) to further assimilate the new instances into system 100.

It will be appreciated that security regarding access to and use of a system 100 can be effectuated by any suitable mechanism. In an embodiment, the complete set of UniViews available to a user is defined by the access rights of the user. Each user may have a strictly defined set of UniViews which that user can view and/or access. In this sense, access to data sources (and certain data therein) can be controlled (e.g., if a UniView to a particular piece of data does not exist, the data will not be returned to the user; furthermore, if no UniViews to a particular data source are accessible to a user, the user will not be able to access the data source). Furthermore, access to dimension instances may also be restricted via user-specific access rights (i.e., a user can be prohibited from receiving data regarding a particular instance if the user is not given access rights to that instance).

Figure 21:
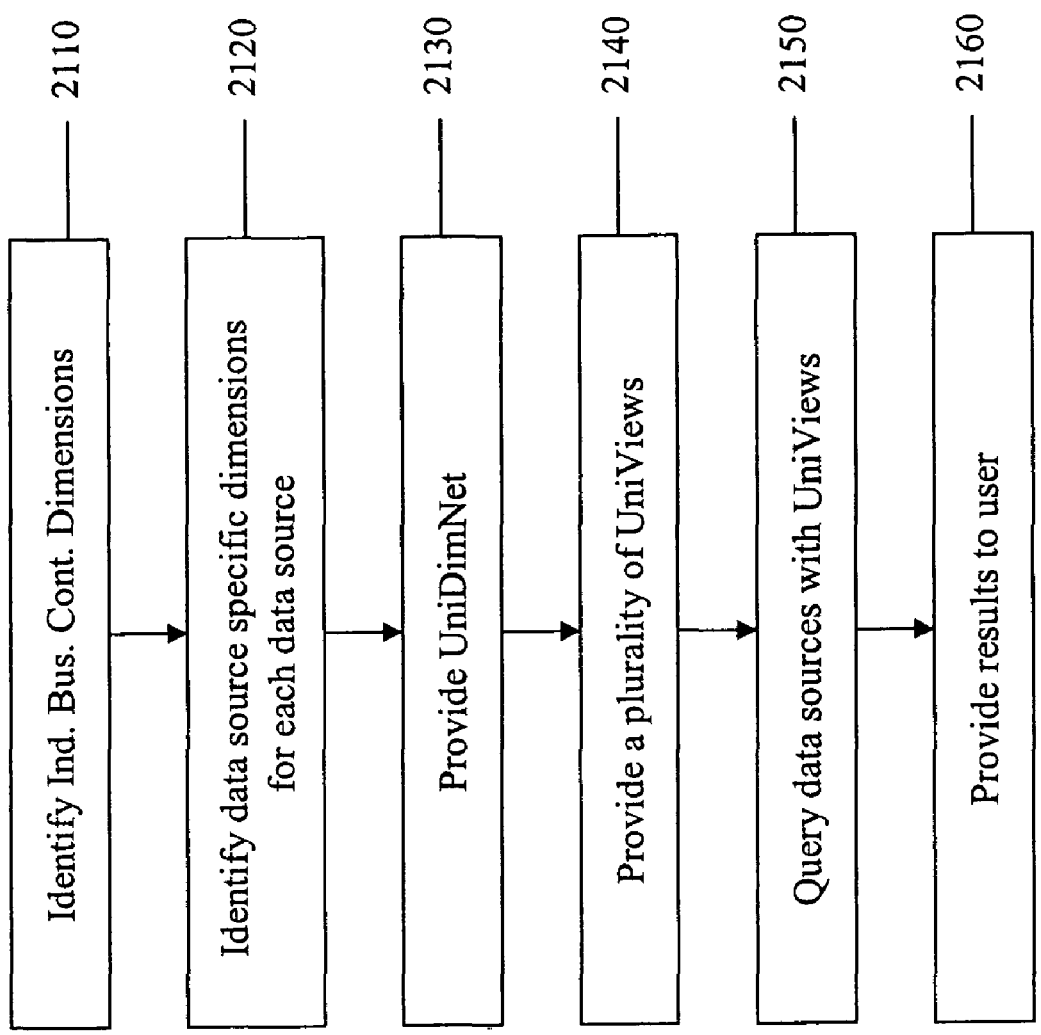
FIG. 21 is an exemplary flowchart of a method of unifying data in accordance with one embodiment of the present invention.

With reference to FIG. 21, an embodiment of a method for unifying data of the present invention is shown. In this embodiment, at step 2110 a plurality of industry business context dimensions is defined. Any appropriate dimensions may be defined for an industry, including but not limited to as previously described herein. At step 2120 a plurality of data source specific dimensions is defined for each data source which may be queried. Appropriate data source specific dimensions may be defined, including but not limited to as previously described herein. At step 2130 a database including representations of the defined dimensions and data source specific dimensions (e.g., a UniDimNet) is provided. Any appropriate database may be provided, including but not limited to a UniDimNet as previously described herein. At step 2140 a plurality of queries adapted for each data source (e.g., a UniView) is provided. Any appropriate queries may be provided, including but not limited to UniViews, UniViewInterfaces and CompoundUniViews as previously described herein. Each query is provided to access a data source using a data access mechanism which facilitates access to the data source. At step 2150 at least one of the data sources is queried by using at least one of the provided queries. For example, as previously described herein, an UniView is used to query a data source associated with the UniView. At step 2160 result(s) of the query are provided to a user. Any appropriate steps for providing such result(s) to the user may be used, including but not limited to use of a GUI provided by a UniViewer as previously described herein.

Figure 22:
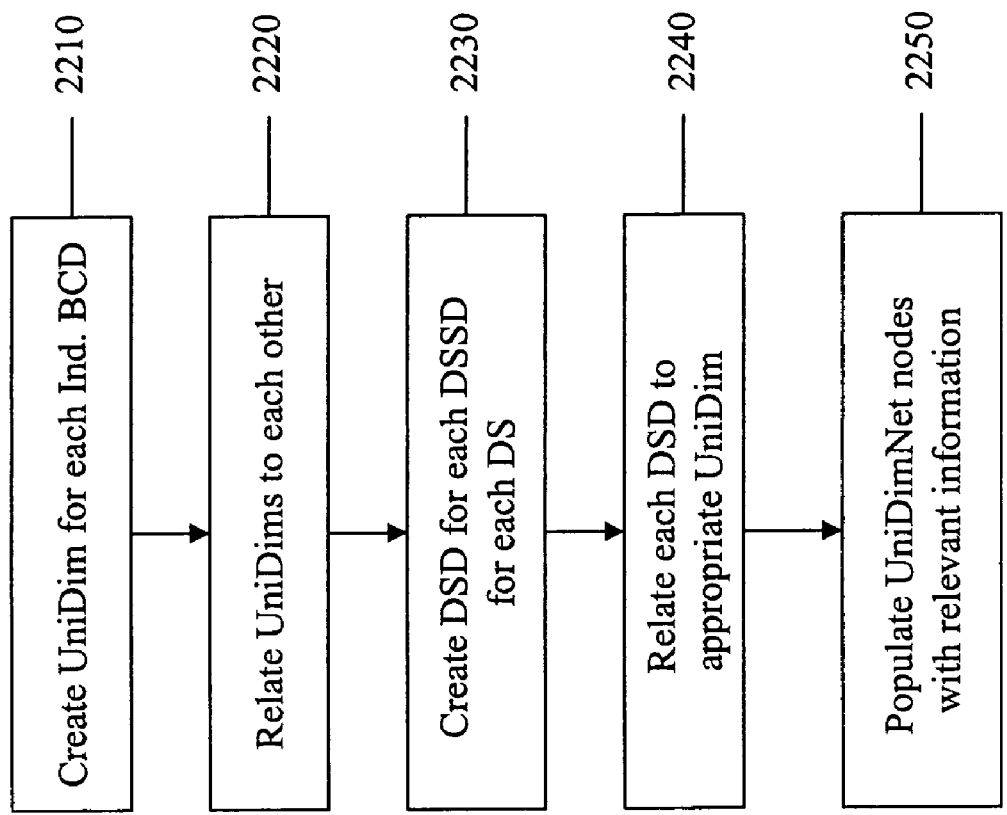
FIG. 22 is an exemplary flowchart of steps of a method of unifying data in accordance with one embodiment of the present invention.

It will be appreciated that the method described above may include any additional appropriate steps and that each step described above may comprise additional substeps. For example, with reference to FIG. 22, step 2120 optionally includes steps 2210-2250. At step 2210, an object in the database is created to represent each industry business context dimension. Any appropriate object may be used, including a UniDim in a table format as previously described herein. At step 2220, each object is related to at least one other object. Objects may be related in any suitable manner, including a hierarchical relationship of UniDims as previously described herein. At step 2230, on object in the database is created to represent each data source specific dimension. Any appropriate object may be used, including a DataSourceDim in a table format as previously described herein. At step 2240, each data source specific dimension object is related to at least one industry business context dimension object. Data source specific dimension objects may be related to industry business context dimension objects in any suitable manner, including as previously described herein. At step 2250, the objects in the database are populated with relevant information. Any relevant information may be stored in the objects in any suitable manner. For example, as previously described herein, the UniDims and the DataSourceDims are populated with unique identifications for each dimension instance.

Those skilled in the art will appreciate that the invention may be realized without utilizing all the above-described steps of the exemplary embodiment, nor must the steps be carried out in the described order.

The invention has been described with reference to the preferred embodiments. Modifications and alterations will occur to others upon a reading and understanding of this specification. It is intended to include all such modifications and alterations insofar as they come within the scope of the appended claims or the equivalents thereof.

We claim:

1. A system for unifying data relating to an industry having a plurality of industry business context dimensions which define logical groupings of data related to the industry, the system comprising:
   one or more computer systems, comprising:
   a plurality of data sources, at least one-two data sources having a physical or logical structure differing from at least one other data source, each data source having data which is capable of a logical contextual grouping into at least one data source specific dimension which contains data related to at least one industry business context dimension, and each data source having a data access mechanism for facilitating querying thereof, wherein each dimension has at least one dimension instance and each of the at least two data sources have data relating to a dimension instance;
   a database having a first and a second plurality of nodes, each of the first plurality of nodes representing an industry business context dimension, each of the second plurality of nodes representing a data source specific dimension of at least one of the data sources, each of the first plurality of nodes related to at least one other of the first plurality of nodes, and each of the second plurality of nodes related to at least one of the first plurality of nodes, wherein the database is stored in at least one of the data sources;
   a plurality of data source query function calls, each query function call querying a single data source regarding a single data source specific dimension, and each query function call using the data access mechanism of the single data source to facilitate access to the single data source; and
   a complex query comprising a plurality of data source query function calls, the complex query querying the at least two data sources for data relating to the dimension instance, the complex query calling the plurality of data source query function calls to perform the querying of the at least two data sources for the data relating to the dimension instance, and wherein the data relating to the dimension instance is retrieved from each of the at least two data sources.

2. The system of claim 1 wherein each dimension has at least one dimension instance, the system further comprising:
   at least one result set object populated by data returned from a query from a user, wherein the query from the user includes selection of at least one dimension instance and at least one query function call without identification by the user of which data source to query.

3. The system of claim 1, further comprising:
   at least one complex query calling a plurality of query function calls to query the plurality of data sources, wherein the one complex query does not identify any data source to query.

4. The system of claim 1, further comprising:
   at least one complex query for data located in a plurality of data sources, the complex query calling a plurality of query function calls to query the plurality of data sources for the data, the complex query having a set of input parameters which define the data to be queried for, the set of input parameters consisting of at least one dimension instance, a query result and a description of the data to be queried.

5. The system of claim 4 wherein the description of the data to be queried is an exact_request_for_information.

6. A system for unifying a plurality of data sources storing data related to an industry, each of the plurality of data sources being a data source instance of a data source type, the system including:
   one or more computer systems, comprising:
   a first plurality of nodes storing information defining a corresponding plurality of business context dimensions for the industry, the first plurality of nodes being interconnected in a manner that represents relationships between the corresponding business context dimensions;
   a second plurality of nodes storing information relating data stored within the plurality of data sources to at least a portion of the plurality of business context dimensions for at least one of i) each data source type represented within the plurality of data sources and ii) each data source instance represented within the plurality of data sources, the second plurality of nodes mapped to the first plurality of nodes based on corresponding business context dimensions, each node of the second plurality of nodes storing information defining at least one business context dimension instance from the plurality of data sources, each business context dimension instance relating to an instance of stored data within the corresponding data source instance associated with the corresponding business context dimension; and
   a first logic element in operative communication with the first and second pluralities of nodes to selectively request desired information from the plurality of data sources based at least in part on selection of one or more of the plurality of business context dimensions defined by the first plurality of nodes, wherein the first logic element identifies data source instances and business context dimension instances associated with the at least one selected business context dimension based at least in part on information stored in the first and second pluralities of nodes, wherein the first logic element is in operative communication with the plurality of data sources to selectively submit a query to each identified data source instance for the desired information and receive a result in response to the query.

7. The system of claim 6 wherein the access to data originating from the plurality of data sources is subject to user-specific access rights associated with at least one of data source types, data source instances, business context dimensions, and business context dimension instances.

8. The system of claim 6 wherein at least the second plurality of nodes is contained in a database.

9. The system of claim 8 wherein each node of the second plurality of nodes includes a table.

10. The system of claim 9 wherein each business context dimension instance has a unique identification within the table of the corresponding node of the second plurality of nodes.

11. The system of claim 6 wherein the plurality of data sources includes first and second data source instances of a first data source type, each of the first and second data source instances storing an instance of data representing a first business context dimension.

12. The system of claim 11 wherein information defining each business context dimension instance within the plurality of data sources is stored in the corresponding node of the first plurality of nodes defining the corresponding business context dimension, the first plurality of nodes including a first business context node storing information defining the first business context dimension, first business context dimension instance, and second business context dimension instance.

13. The system of claim 11 wherein the second plurality of nodes includes a first data source node storing information relating data stored within at least one data source of the first data source type to the first business context dimension, the first data source node also storing information defining the first business context dimension instance and second business context dimension instance.

14. The system of claim 11 wherein the second plurality of nodes includes a first data source node storing information relating data stored within the first data source instance to the first business context dimension and a second data source node storing information relating data stored within the second data source instance to the first business context dimension, the first data source node also storing information defining the first business context dimension instance, and the second data source node also storing information defining the second business context dimension instance.

15. The system of claim 11 wherein the first business context dimension is selected in conjunction with a first request for desired information by the first logic element, the first logic element submitting a first query to at least the first and second data source instances.

16. The system of claim 6 wherein the plurality of data sources includes a first data source instance of a first data source type and a second data source instance of a second data source type, each of the first and second data source instances storing an instance of data representing a first business context dimension.

17. The system of claim 16 wherein information defining each business context dimension instance within the plurality of data sources is stored in the corresponding node of the first plurality of nodes defining the corresponding business context dimension, the first plurality of nodes including a first business context node storing information defining the first business context dimension, first business context dimension instance, and second business context dimension instance.

18. The system of claim 16 wherein the second plurality of nodes includes a first data source node storing information relating data stored within at least one data source of the first data source type to the first business context dimension and a second data source node storing information relating data stored within at least one data source of the second data source type to the first business context dimension, the first data source node also storing information defining the first business context dimension instance, and the second data source node also storing information defining the second business context dimension instance.

19. The system of claim 16 wherein the second plurality of nodes includes a first data source node storing information relating data stored within the first data source instance to the first business context dimension and a second data source node storing information relating data stored within the second data source instance to the first business context dimension, the first data source node also storing information defining the first business context dimension instance, and the second data source node also storing information defining the second business context dimension instance.

20. The system of claim 16 wherein the first business context dimension is selected in conjunction with a first request for desired information by the first logic element, the first logic element submitting a first query to at least the first data source instance and a second query to at least the second data source instance.

21. The system of claim 6 wherein the first logic element includes a user interface adapted to permit a user to perform at least one of selecting at least one business context dimension, selecting the desired information, and submitting the query.

22. The system of claim 6, further including:
a second logic element defining the plurality of business concept dimensions based at least in part on reviewing the plurality of data sources and determining logical groupings of the data stored therein, wherein the second logic element generates the first plurality of nodes based at least in part on the defined plurality of business concept dimensions.

23. The system of claim 6, further including:
a second logic element generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business concept dimensions.

24. The system of claim 6, further including:
a second logic element in communication with the first logic element to store at least one query submitted by the first logic element for use in a subsequent request for the corresponding desired information.

25. The system of claim 6, further including:
a second logic element in communication with the first logic element to store at least one result received by the first logic element in response to a corresponding query for use in conjunction with a subsequent request for the corresponding desired information.

26. A system for unifying a plurality of data related to an industry, including:
one or more computer systems, comprising;
a plurality of data sources storing data related to the industry, each of the plurality of data sources being a data source instance of a data source type;
a first plurality of nodes storing information defining a corresponding plurality of business context dimensions for the industry, the first plurality of nodes being interconnected in a manner that represents relationships between the corresponding business context dimensions;
a second plurality of nodes storing information relating data stored within the plurality of data sources to at least a portion of the plurality of business context dimensions for at least one of i) each data source type represented within the plurality of data sources and ii) each data source instance represented within the plurality of data sources, the second plurality of nodes mapped to the first plurality of nodes based on corresponding business context dimensions, each node of the second plurality of nodes storing information defining at least one business context dimension instance from the plurality of data sources, each business context dimension instance relating to an instance of stored data within the corresponding data source instance associated with the corresponding business context dimension; and a first logic element in operative communication with the first and second pluralities of nodes to selectively request desired information from the plurality of data sources based at least in part on selection of one or more of the plurality of business context dimensions defined by the first plurality of nodes, wherein the first logic element identifies data source instances and business context dimension instances associated with the at least one selected business context dimension based at least in part on information stored in the first and second pluralities of nodes, wherein the first logic element is in operative communication with the plurality of data sources to selectively submit a query to each identified data source instance for the desired information and receive a result in response to the query.

27. The system of claim 26 wherein the access to data originating from the plurality of data sources is subject to user-specific access rights associated with at least one of data source types, data source instances, business context dimensions, and business context dimension instances.

28. The system of claim 26, the first logic element including:
a user interface adapted to permit a user to perform at least one of selecting at least one business context dimension, selecting the desired information, and submitting the query, the system.

29. The system of claim 26, further including:
a second logic element defining the plurality of business concept dimensions based at least in part on reviewing the plurality of data sources and determining logical groupings of the data stored therein, wherein the second logic element generates the first plurality of nodes based at least in part on the defined plurality of business concept dimensions.

30. The system of claim 26, further including:
a second logic element generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business concept dimensions.

31. A method for unifying a plurality of data sources storing data related to an industry, each of the plurality of data sources being a data source instance of a data source type, the method including:
a) storing information in a first plurality of nodes that defines a corresponding plurality of business context dimensions for the industry and interconnecting the first plurality of nodes in a manner that represents relationships between the corresponding business context dimensions;
b) storing information in a second plurality of nodes that indicates data stored within the plurality of data sources corresponds to at least a portion of the plurality of business context dimensions for at least one of i) each data source type represented within the plurality of data sources or ii) each data source instance represented within the plurality of data sources, and mapping the second plurality of nodes to the first plurality of nodes based on corresponding business context dimensions;
c) storing information in each node of the second plurality of nodes that defines at least one business context dimension instance from the plurality of data sources, each business context dimension instance relating to an instance of stored data within the corresponding data source instance associated with the corresponding business context dimension;
d) initiating a request for desired information from the plurality of data sources based at least in part on selection of one or more of the plurality of business context dimensions defined by the first plurality of nodes; and
e) identifying data source instances and business context dimension instances associated with the at least one selected business context dimension based at least in part on information stored in the first and second pluralities of nodes.

32. The method of claim 31, further including:
f) submitting a query to each identified data source instance for the desired information.

33. The method of claim 32, further including:
g) storing at least one query submitted in f) for use in a subsequent request for the corresponding desired information in lieu of repeating d) and e).

34. The method of claim 32, further including:
g) receiving a result from at least one data source instance in response to the query.

35. The method of claim 34, further including:
h) storing at least one result received in g) for use in conjunction with a subsequent request for the corresponding desired information in lieu of repeating g).

36. The method of claim 34 wherein at least one of the initiating in d), identifying in e), submitting in f), and receiving in g) is subject to user-specific access rights associated with at least one of data source types, data source instances, business context dimensions, and business context dimension instances in conjunction with access to data originating from the plurality of data sources.

37. The method of claim 31 wherein the plurality of data sources includes first and second data source instances of a first data source type and each of the first and second data source instances store an instance of data representing a first business context dimension.

38. The method of claim 37, further including:
f) storing information defining each business context dimension instance within the plurality of data sources in the corresponding node of the first plurality of nodes that defines the corresponding business context dimension, including storing information defining the first business context dimension, first business context dimension instance, and second business context dimension instance in a first business context node of the first plurality of nodes.

39. The method of claim 37, in conjunction with the storing in b), the method further including:
f) storing information in a first data source node of the second plurality of nodes that indicates data stored within at least one data source of the first data source type corresponds to the first business context dimension; and
g) storing information in the first data source node that defines the first business context dimension instance and second business context dimension instance.

40. The method of claim 37, in conjunction with the storing in b), the method further including:
f) storing information in a first data source node of the second plurality of nodes that indicates data stored within the first data source instance corresponds to the first business context dimension;
g) storing information in a second data source node of the second plurality of nodes that indicates data stored within the second data source instance corresponds to the first business context dimension;

h) storing information in the first data source node that defines the first business context dimension instance; and i) storing information in the second data source node that defines the second business context dimension instance.

41. The method of claim 37, further including:

f) in conjunction with the initiating in d), initiating a first request for desired information from the plurality of data sources based at least in part on selection of the first business context dimension; and g) submitting a first query to at least the first and second data source instances for the desired information.

42. The method of claim 31 wherein the plurality of data sources includes a first data source instance of a first data source type and a second data source instance of a second data source type, each of the first and second data source instances storing an instance of data representing a first business context dimension.

43. The method of claim 42, further including:

f) storing information defining each business context dimension instance within the plurality of data sources in the corresponding node of the first plurality of nodes that defines the corresponding business context dimension, including storing information defining the first business context dimension, first business context dimension instance, and second business context dimension instance in a first business context node of the first plurality of nodes.

44. The method of claim 42, in conjunction with the storing in b), the method further including:

f) storing information in a first data source node of the second plurality of nodes that indicates data stored within at least one data source of the first data source type corresponds to the first business context dimension;

g) storing information in a second data source node of the second plurality of nodes that indicates data stored within at least one data source of the second data source type corresponds to the first business context dimension;

h) storing information in the first data source node that defines the first business context dimension instance; and i) storing information in the second data source node that defines the second business context dimension instance.

45. The method of claim 42, in conjunction with the storing in b), the method further including:

f) storing information in a first data source node of the second plurality of nodes that indicates data stored within the first data source instance corresponds to the first business context dimension;

g) storing information in a second data source node of the second plurality of nodes that indicates data stored within the second data source instance corresponds to the first business context dimension;

h) storing information in the first data source node that defines the first business context dimension instance; and i) storing information in the second data source node that defines the second business context dimension instance.

46. The method of claim 42, further including:

f) in conjunction with the initiating in d), initiating a first request for desired information from the plurality of data sources based at least in part on selection of the first business context dimension; and g) submitting a first query to at least the first data source instance and a second query to at least the second data source instance for the desired information.

47. The method of claim 31 wherein the initiating in d) is also based at least in part on selection of at least one data source type or at least one data source instance from which to request the desired information.

48. The method of claim 31, further including:

f) defining the plurality of business concept dimensions based at least in part on reviewing the plurality of data sources and determining logical groupings of the data stored therein;

g) generating the first plurality of nodes based at least in part on the defined plurality of business concept dimensions; and h) generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business concept dimensions.

49. A method for unifying data related to an industry, including:

a) identifying a plurality of data sources storing data related to the industry, each of the plurality of data sources being a data source instance of a data source type;

b) storing information in a first plurality of nodes that defines a corresponding plurality of business context dimensions for the industry and interconnecting the first plurality of nodes in a manner that represents relationships between the corresponding business context dimensions;

c) storing information in a second plurality of nodes that indicates data stored within the plurality of data sources corresponds to at least a portion of the plurality of business context dimensions for at least one of i) each data source type represented within the plurality of data sources or ii) each data source instance represented within the plurality of data sources, and mapping the second plurality of nodes to the first plurality of nodes based on corresponding business context dimensions;

d) storing information in each node of the second plurality of nodes that defines at least one business context dimension instance from the plurality of data sources, each business context dimension instance relating to an instance of stored data within the corresponding data source instance associated with the corresponding business context dimension;

e) initiating a request for desired information from the plurality of data sources based at least in part on selection of one or more of the plurality of business context dimensions defined by the first plurality of nodes;

f) identifying data source instances and business context dimension instances associated with the at least one selected business context dimension based at least in part on information stored in the first and second pluralities of nodes;

g) submitting a query to each identified data source instance for the desired information;

h) storing at least one query submitted in g) for use in a subsequent request for the corresponding desired information in lieu of repeating e) and f);

i) receiving a result from at least one data source instance in response to the query;

j) storing at least one result received in i) for use in conjunction with a subsequent request for the corresponding desired information in lieu of repeating g).

50. The method of claim 49 wherein at least one of the initiating in e), identifying in f), submitting in g), and receiving in i) is subject to user-specific access rights associated with at least one of data source types, data source instances, business context dimensions, and business context dimension instances in conjunction with access to data originating from the plurality of data sources.

51. The method of claim 49, further including:

k) storing information defining each business context dimension instance within the plurality of data sources in the corresponding node of the first plurality of nodes that defines the corresponding business context dimension.

52. The method of claim 49, further including:

k) defining the plurality of business concept dimensions based at least in part on reviewing the plurality of data sources and determining logical groupings of the data stored therein;

l) generating the first plurality of nodes based at least in part on the defined plurality of business concept dimensions; and m) generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business concept dimensions.

* * * * *

UNITED STATES PATENT AND TRADEMARK OFFICE
CERTIFICATE OF CORRECTION

PATENT NO.         : 7,464,087 B2                                                     Page 1 of 1
APPLICATION NO. : 10/628884
DATED              : December 9, 2008
INVENTOR(S)        : Marc J. Shlaes et al.

It is certified that error appears in the above-identified patent and that said Letters Patent is hereby corrected as shown below:

On the title page, item (75) Inventors: after "Berkel" please delete "Cologne" and insert -- Koeln --.

On the title page, item (75) Inventors: after "Engel" please delete "Cologne" and insert -- Koeln --.

Claim 1, column 23, line 17, after "least" please delete "one-".

Claim 26, column 26, line 40, after "unifying" please delete "a plurality of".

Signed and Sealed this

Twenty-fourth Day of March, 2009

JOHN DOLL
*Acting Director of the United States Patent and Trademark Office*

(12) EX PARTE REEXAMINATION CERTIFICATE (10289th)
United States Patent
Shlaes et al.

(10) Number: US 7,464,087 C1
(45) Certificate Issued: Sep. 4, 2014

(54) METHOD AND SYSTEM OF UNIFYING DATA

(75) Inventors: Marc J. Shlaes, Shaker Heights, OH (US); Jochen van Berkel, Cologne (DE); Hermann Engel, Cologne (DE); Mario Jugel, Herschbach (DE)

(73) Assignee: Datatrak International, Inc., Cleveland, OH (US)

Reexamination Request:
No. 90/011,985, Oct. 28, 2011

Reexamination Certificate for:
Patent No.: 7,464,087
Issued: Dec. 9, 2008
Appl. No.: 10/628,884
Filed: Jul. 28, 2003

Certificate of Correction issued Mar. 24, 2009

Related U.S. Application Data

(60) Provisional application No. 60/398,841, filed on Jul. 26, 2002.

(51) Int. Cl.
*G06F 7/00* (2006.01)

(52) U.S. Cl.
USPC ............. 707/603; 707/999.003; 707/999.006; 707/999.104; 707/999.005

(58) Field of Classification Search
None
See application file for complete search history.

(56) References Cited

To view the complete listing of prior art documents cited during the proceeding for Reexamination Control Number 90/011,985, please refer to the USPTO's public Patent Application Information Retrieval (PAIR) system under the Display References tab.

*Primary Examiner* — Stephen J Ralis

(57) ABSTRACT

A system, method and database design is provided for unifying data from a plurality of heterogeneous databases, each having business-context related data and a data access mechanism. A database is created (e.g., the UniDimNet) which contains a node for each dimension of an industry. For each data source which is accessible via the system, a set of data source specific dimensions is created and mapped to the corresponding industry business context dimension(s). A set of templates (e.g., UniViews) is created to query the data sources. Each UniView contains a specific question for a specific dimension designed for a specific data source. UniViews query the database they are associated with by using the data access mechanism of the associated database. A central server coordinates the system and facilitates use of the system through an interface (e.g., the UniViewer). The UniViewer allows a user to query the data sources by identifying an industry business context dimension, a dimension instance and at least one UniView. Multiple UniViews can be combined, cached and saved to facilitate complex queries.

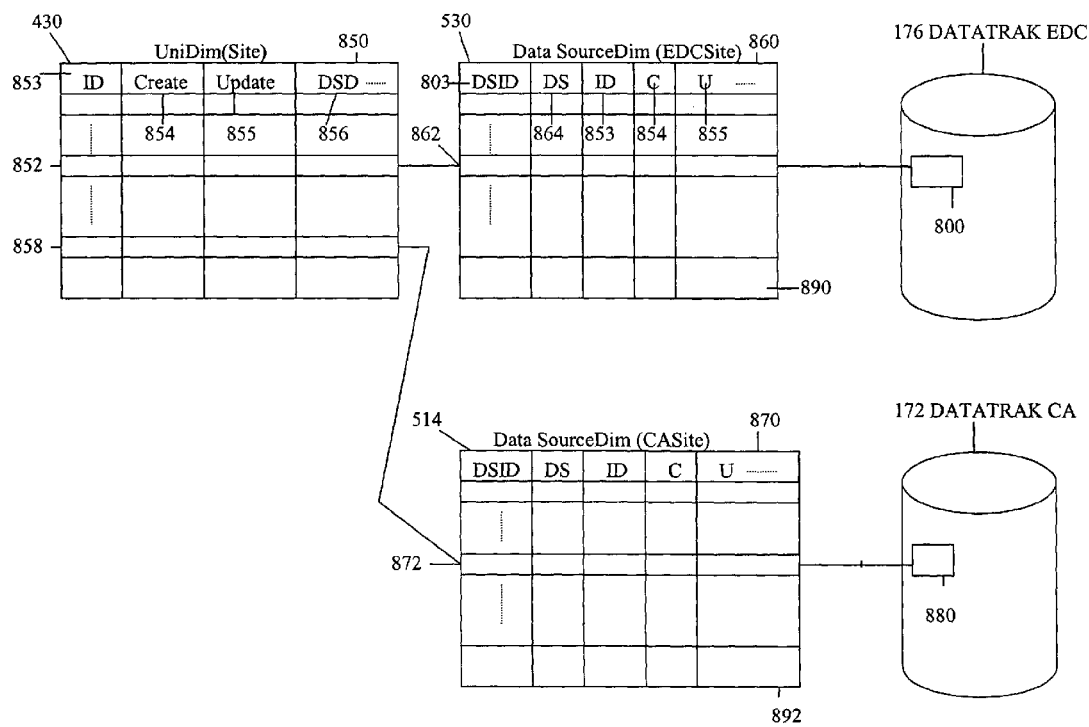

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6-21, 24-28, 31-47 and 49-51 is confirmed.

Claims 1-5 are cancelled.

Claims 22, 23, 29, 30, 48 and 52 are determined to be patentable as amended.

22. The system of claim 6, further including:
a second logic element defining the plurality of business [concept] *context* dimensions based at least in part on reviewing the plurality of data sources and determining logical groupings of the data stored therein, wherein the second logic element generates the first plurality of nodes based at least in part on the defined plurality of business [concept] *context* dimensions.

23. The system of claim 6, further including:
a second logic element generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business [concept] *context* dimensions.

29. The system of claim 26, further including:
a second logic element defining the plurality of business [concept] *context* dimensions based at least in part on reviewing the plurality of data sources and determining logical groupings of the data stored therein, wherein the second logic element generates the first plurality of nodes based at least in part on the defined plurality of business [concept] *context* dimensions.

30. The system of claim 26, further including:
a second logic element generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business [concept] *context* dimensions.

48. The method of claim 31, further including:
f) defining the plurality of business [concept] *context* dimensions based at least in part on reviewing the plurality of data sources and determining logical groupings of the data stored therein;
g) generating the first plurality of nodes based at least in part on the defined plurality of business [concept] *context* dimensions; and
h) generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business [concept] *context* dimensions.

52. The method of claim 49, further including:
k) defining the plurality of business [concept] *context* dimensions based at least in part on reviewing the plurality of data sources and determining logical groupings of the data stored therein;
l) generating the first plurality of nodes based at least in part on the defined plurality of business [concept] *context* dimensions; and
m) generating the second plurality of nodes based at least in part on one or more of i) analyzing internal data structures of one or more of the plurality of data sources, ii) analyzing the data stored within one or more of the plurality of data sources, iii) determining business contexts of data stored within one or more of the plurality of data sources, and iv) determining logical groupings of data stored within one or more of the plurality of data sources in relation to the plurality of business [concept] *context* dimensions.

\* \* \* \* \*